United States Patent
Hao et al.

(10) Patent No.: US 10,484,203 B2
(45) Date of Patent: Nov. 19, 2019

(54) METHOD FOR IMPLEMENTING COMMUNICATION BETWEEN NVO3 NETWORK AND MPLS NETWORK, AND APPARATUS

(71) Applicant: HUAWEI TECHNOLOGIES CO., LTD., Shenzhen, Guangdong (CN)

(72) Inventors: Weiguo Hao, Nanjing (CN); Qiandeng Liang, Nanjing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 204 days.

(21) Appl. No.: 15/393,049

(22) Filed: Dec. 28, 2016

(65) Prior Publication Data

US 2017/0118043 A1    Apr. 27, 2017

Related U.S. Application Data

(63) Continuation of application No. PCT/CN2015/092876, filed on Oct. 26, 2015.

(30) Foreign Application Priority Data

Oct. 27, 2014   (CN) .......................... 2014 1 0584292

(51) Int. Cl.
*H04L 12/46*   (2006.01)
*H04L 12/66*   (2006.01)
(Continued)

(52) U.S. Cl.
CPC ...... *H04L 12/4633* (2013.01); *H04L 12/4641* (2013.01); *H04L 12/4679* (2013.01);
(Continued)

(58) Field of Classification Search
None
See application file for complete search history.

(56) References Cited

U.S. PATENT DOCUMENTS 8,179,905 B1   5/2012 Napierala et al.
2006/0182122 A1   8/2006 Davie et al.
(Continued)

FOREIGN PATENT DOCUMENTS

CN   103200069      7/2013
CN   103200069 A    7/2013
(Continued)

OTHER PUBLICATIONS

European Application No. 15853776.1, Extended European Search Report, dated May 15, 2017, 8 pages.
(Continued)

*Primary Examiner* — Chi H Pham
*Assistant Examiner* — Raul Rivas
(74) *Attorney, Agent, or Firm* — Womble Bond Dickinson (US) LLP

(57) ABSTRACT

This application discloses a method for implementing communication between an NVO3 network, to implement inter-AS communication between an NVO3 network and an MPLS VPN network. The method includes: obtaining an identifier of a PE device in the MPLS network and an MPLS label allocated by an ASBR in the MPLS network; allocating an IP address for the MPLS label from a local address pool; sending routing information to an NVE, where the routing information includes an identifier of the PE device and the allocated IP address, and the allocated IP address is used as an outer destination address of an NVO3 encapsulated packet sent by a TES in the NVO3 network to a CE device connected to the PE device in the MPLS network.

14 Claims, 10 Drawing Sheets

---

An NVE in an NVO3 network receives routing information sent by an ASBR in the NVO3 network, where the routing information includes a correspondence between an IP address and an identifier that is of a PE device in an MPLS network, and the IP address is allocated by the ASBR in the NVO3 network to the PE device from a local address pool — 210

The NVE receives an MPLS VPN label advertised by the PE device and an identifier of the CE device, where the MPLS VPN label is used to identify a VPN to which the CE device belongs — 220

The NVE generates VPN routing information, where the VPN routing information includes the identifier of the CE device, the allocated IP address, and a VN ID, the VN ID is the MPLS VPN label, and the allocated IP address is used as an outer destination address of NVO3 encapsulation — 230

(51) Int. Cl.
*H04L 12/723* (2013.01)
*H04L 29/12* (2006.01)

(52) U.S. Cl.
CPC .............. *H04L 12/66* (2013.01); *H04L 45/50* (2013.01); *H04L 61/2061* (2013.01); *H04L 2212/00* (2013.01)

(56) References Cited

U.S. PATENT DOCUMENTS

| | | |
|---|---|---|
| 2012/0224579 A1 | 9/2012 | Ashwood-Smith |
| 2014/0086253 A1 | 3/2014 | Yong |
| 2016/0285736 A1 | 9/2016 | Gu |

FOREIGN PATENT DOCUMENTS

| | | |
|---|---|---|
| CN | 103685026 | 3/2014 |
| CN | 103685026 A | 3/2014 |
| CN | 103841023 A | 6/2014 |
| CN | 104104534 | 10/2014 |
| CN | 104104534 A | 10/2014 |
| CN | 104518940 | 4/2015 |
| CN | 104518940 A | 4/2015 |
| WO | 2013/185644 A1 | 12/2013 |
| WO | WO-2013/185644 | 12/2013 |

OTHER PUBLICATIONS

Hao, Weiguo, et al, "Inter-AS Option B between NVO3 and MPLS EVPN network," L2VPN, Internet Draft, China Mobile, Jul. 4, 2014, 14 pages.

Hao, Weiguo, et al, "I Inter-AS Option B between NVO3 and BGP/MPLS IP VPN network," L2VPN, Internet Draft, Hickory Hill Consulting, Jul. 1, 2014, 15 pages.

"International Search Report of the International Searching Authority dated Jan. 20, 2016; International Application No. PCT/CN2015/092876", (dated Jan. 20, 2016).

METHOD FOR IMPLEMENTING COMMUNICATION BETWEEN NVO3 NETWORK AND MPLS NETWORK, AND APPARATUS

CROSS-REFERENCE TO RELATED APPLICATIONS

This application is a continuation of International Application No. PCT/CN2015/092876, filed on Oct. 26, 2015, which claims priority to Chinese Patent Application No. 201410584292.8, filed on Oct. 27, 2014. The disclosures of the aforementioned applications are hereby incorporated by reference in their entireties.

TECHNICAL FIELD

Aspects of the invention relates to the field of communications technologies, and in particular, to a method for implementing communication between an NVO3 network and an MPLS network, and an apparatus.

BACKGROUND

Network Virtualization over Layer 3 (NVO3) is a technology for implementing network virtualization. By means of this technology, a physical network can be virtualized, so that the network can be used by different tenants together. An NVO3 encapsulation header includes a 24-bit virtual network identifier (VN ID). Different VN IDs are used to identify different virtual networks (Virtual Network, VN), and different VN IDs may be used to isolate traffic between different tenants belonging to different VNs.

Typical data encapsulation in the NVO3 technology includes a Virtual Extensible Local Area Network (VX-LAN), Network virtualization Generic Routing Encapsulation (NVGRE), and the like. The VXLAN uses an encapsulation manner of Media Access Control (MAC) In User Datagram Protocol (UDP), and the NVGRE uses an encapsulation manner of MAC In Generic Routing Encapsulation (GRE).

An edge device of an NVO3 network is referred to as a network virtualization edge (NVE). The NVE accesses a tenant end system (TES), and the TES may be briefly referred to as a tenant system (TS). The NVE is similar to a Provider Edge (PE) device in a Border Gateway Protocol (BGP)/multiprotocol label switching (MPLS) Internet protocol (IP) virtual private network (VPN) network, and the TS is similar to a Customer Edge (CE) device in a BGP/MPLS IP VPN network. The NVE may be located on a server or a physical network device, and the TS may be a value-added service device such as a virtual machine of a server, a physical server, a firewall, or a load balancer.

The NVO3 network is increasingly widely applied to a data center (DC).

An MPLS VPN network is widely deployed in a conventional telecommunications network. The MPLS VPN includes a layer 2 (L2) VPN and a layer 3 (L3) VPN. A user needs to access a data center by using an MPLS VPN network, and the MPLS VPN network and the NVO3 network generally belong to two autonomous system (AS) domains, when the data center is accessed by using the MPLS VPN network, an inter-AS interconnection problem is involved.

Option C is a manner for implementing inter-AS internetworking. In the Option C manner, a BGP Label Switch Path (LSP) is first established between PE devices, and then VPN route is exchanged. By means of a multi-hop MP-EBGP, VPN routing information is directly transmitted between a source PE and a sink PE. In the Option C manner, an Autonomous System Border Router (ASBR) at an AS domain edge does not need to store VPN route, and the VPN route is processed by a PE, so that scalability is relatively good.

However, in the Option C manner, an inter-AS LSP needs to be established between PEs in different AS domains, labels are distributed within a domain by means of a Label Distribution Protocol (LDP), labels are distributed between domains by means of a single-hop External Border Gateway Protocol (EBGP), and the PEs in different AS domains transmit VPN routing information by means of a multi-hop multiprotocol (MP)-EBGP. When packet forwarding is performed, L3 label forwarding is used within a domain, and L2 label forwarding is used between ASBRs in two AS domains. Because the MPLS network needs to be deployed in both of the two AS domains communicating with each other, the OPTION C manner can implement only interconnection between homogeneous networks of an MPLS VPN.

SUMMARY

Embodiments of the invention provide a method for implementing communication between an NVO3 network and an MPLS network, and an apparatus, to implement inter-AS communication between the NVO3 network and the MPLS network.

In one aspect, the invention provides a method for implementing communication between an NVO3 network and an MPLS network, where the NVO3 network is deployed in a first autonomous system AS, and the MPLS network is deployed in a second AS, and the method includes:

obtaining, by an autonomous system border router (ASBR) in the NVO3 network, an identifier of a provider edge PE device in the MPLS network and an MPLS label allocated by an ASBR in the MPLS network, where the MPLS label allocated by the ASBR in the MPLS network is used as an outer label of an MPLS encapsulated packet sent by the ASBR in the NVO3 network to the PE device;

allocating, by the ASBR in the NVO3 network, an IP address for the MPLS label from a local address pool, where the ASBR in the NVO3 network communicates with a network virtualization edge (NVE) in the NVO3 network, and a tenant end system TES connected to the NVE and a customer edge CE device connected to the PE device belong to a same virtual private network (VPN);

storing, by the ASBR in the NVO3 network, a correspondence between the MPLS label and the allocated IP address; and sending, by the ASBR in the NVO3 network, routing information to the NVE, where the routing information includes an identifier of the PE device and the allocated IP address, and the allocated IP address is used as an outer destination address of an NVO3 encapsulated packet sent by the TES to the CE device.

In one aspect, obtaining, by an ASBR in the NVO3 network, an identifier of a PE device in the MPLS network and an MPLS label allocated by an ASBR in the MPLS network includes: receiving, by the ASBR in the NVO3 network, a BGP packet sent by the ASBR in the MPLS network, where the BGP packet sent by the ASBR in the MPLS network carries the identifier of the PE device and the MPLS label allocated by the ASBR in the MPLS network.

In one aspect, the method further includes: receiving, by the ASBR in the NVO3 network, an NVO3 encapsulated packet sent by the NVE, where an outer destination address of the NVO3 encapsulated packet is the allocated IP address, an outer source address of the NVO3 encapsulated packet is an IP address of the NVE, the NVO3 encapsulated packet further includes a virtual network identifier (VN ID), the VN ID is an MPLS VPN label advertised by the PE device, and the MPLS VPN label is used to identify the VPN to which the CE device belongs; generating, by the ASBR in the NVO3 network, a packet, where the generated packet carries two layers of MPLS labels, the MPLS label allocated by the ASBR in the MPLS network is used as an outer label in the two layers of MPLS labels, the VN ID is used as an inner label in the two layers of MPLS labels, the generated packet does not include the outer destination address and the outer source address, and the generated packet further carries a payload of the NVO3 encapsulated packet; and sending, by the ASBR in the NVO3 network, the generated packet to the ASBR in the MPLS network.

In one aspect, the method further includes: allocating, by the ASBR in the NVO3 network, an MPLS label for an identifier of the NVE; sending, by the ASBR in the NVO3 network, a BGP packet to the ASBR in the MPLS network, where the BGP packet sent to the ASBR in the MPLS network carries the identifier of the NVE and the MPLS label allocated for the identifier of the NVE; and storing, by the ASBR in the NVO3 network, a correspondence between the identifier of the NVE and the MPLS label allocated for the identifier of the NVE.

In one aspect, the method further includes: receiving, by the ASBR in the NVO3 network, a packet forwarded by the ASBR in the MPLS network, where the packet forwarded by the ASBR in the MPLS network is from the PE device, an inner label of the packet forwarded by the ASBR in the MPLS network is a VN ID of a virtual network to which the TES belongs, and an outer label of the packet forwarded by the ASBR in the MPLS network is the MPLS label allocated for the identifier of the NVE; generating, by the ASBR in the NVO3 network, an NVO3 encapsulated packet, where an outer destination address of the generated NVO3 encapsulated packet is an IP address of the NVE, an outer source address of the generated NVO3 encapsulated packet is an IP address of the ASBR in the NVO3 network, the generated NVO3 encapsulated packet further carries the VN ID of the virtual network to which the TES belongs, and the generated NVO3 encapsulated packet further carries a payload of the packet forwarded by the ASBR in the MPLS network; and sending, by the ASBR in the NVO3 network, the generated NVO3 encapsulated packet to the NVE.

In one aspect, the identifier of the PE device is an IP address of the PE device.

Another aspect of the invention provides a method for implementing communication between an NVO3 network and an MPLS network, where the NVO3 network is deployed in a first autonomous system (AS), and the MPLS network is deployed in a second AS, and the method includes:

receiving, by a network virtualization edge NVE in the NVO3 network, routing information sent by an autonomous system border router (ASBR) in the NVO3 network, where the routing information includes a correspondence between an IP address and an identifier that is of a provider edge (PE) device in the MPLS network, the IP address is allocated by the ASBR in the NVO3 network to the PE device from a local address pool, and is used as an outer destination address of an NVO3 encapsulated packet sent by a tenant end system (TES) connected to the NVE to a customer edge CE device connected to the PE device, and the TES connected to the NVE and the customer edge (CE) device connected to the PE device belong to a same virtual private network VPN;

receiving, by the NVE, an MPLS VPN label advertised by the PE device and an identifier of the CE device, where the MPLS VPN label is used to identify the VPN to which the CE device belongs; and generating, by the NVE, VPN routing information, where the VPN routing information includes the identifier of the CE device, the allocated IP address, and a VN ID, the VN ID is the MPLS VPN label, and the allocated IP address is used as an outer destination address of NVO3 encapsulation.

In one aspect, the method further includes: receiving, by the NVE, a packet sent by the TES to the PE device, where the packet sent to the PE device carries the identifier of the CE device; performing, by the NVE, NVO3 encapsulation on the packet sent by the TES to the PE device, to generate an NVO3 encapsulated packet, where an outer destination address of the NVO3 encapsulated packet is the allocated IP address, an outer source address of the NVO3 encapsulated packet is an IP address of the NVE, the NVO3 encapsulated packet further includes a VN ID, the VN ID is the MPLS VPN label advertised by the PE device, and the MPLS VPN label is used to identify the VPN to which the CE device belongs; and sending, by the NVE, the NVO3 encapsulated packet to the ASBR in the NVO3 network.

In one aspect, the method further includes: sending, by the NVE, VPN routing to the PE device, where the VPN routing carries an MPLS VPN label and an identifier of the TES, and the MPLS VPN label carried in the VPN route is a VN ID of a virtual network to which the TES belongs.

In one aspect, the method further includes: receiving, by the NVE, an NVO3 encapsulated packet sent by the ASBR in the NVO3 network, where an outer destination address of the NVO3 encapsulated packet received by the NVE is an IP address of the NVE, an outer source address of the NVO3 encapsulated packet received by the NVE is an IP address of the ASBR in the NVO3 network, and the NVO3 encapsulated packet received by the NVE further carries the VN ID of the virtual network to which the TES belongs; and decapsulating, by the NVE, the received NVO3 encapsulated packet, and sending a decapsulated packet to the TES in the NVO3 network according to the VN ID of the virtual network to which the TES belongs.

In one aspect, the identifier of the PE device is an IP address of the PE device.

Another aspect of the invention provides an autonomous system border router (ASBR), where a network virtualization over layer 3 (NVO3) network is deployed in a first autonomous system (AS), a multiprotocol label switching (MPLS) network is deployed in a second AS, and the ASBR is a border router BR in the first AS, and the ASBR includes:

a receiving module, configured to obtain an identifier of a provider edge (PE) device in the MPLS network and an MPLS label allocated by an ASBR in the MPLS network, where the MPLS label allocated by the ASBR in the MPLS network is used as an outer label of an MPLS encapsulated packet sent by the ASBR in the NVO3 network to the PE device;

an allocation module, configured to allocate an IP address for the MPLS label from a local address pool, where the ASBR in the NVO3 network communicates with a network virtualization edge (NVE) in the NVO3 network, and a tenant end system (TES) connected to the NVE and a customer edge (CE) device connected to the PE device belong to a same virtual private network (VPN);

a storage module, configured to store a correspondence between the MPLS label and the allocated IP address; and a sending module, configured to send routing information to the NVE, where the routing information includes an identifier of the PE device and the allocated IP address, and the allocated IP address is used as an outer destination address of an NVO3 encapsulated packet sent by the TES to the CE device.

In one aspect, the receiving module is specifically configured to receive a BGP packet sent by the ASBR in the MPLS network, where the BGP packet sent by the ASBR in the MPLS network carries the identifier of the PE device and the MPLS label allocated by the ASBR in the MPLS network.

In one aspect, the receiving module is further configured to receive an NVO3 encapsulated packet sent by the NVE, where an outer destination address of the NVO3 encapsulated packet is the allocated IP address, an outer source address of the NVO3 encapsulated packet is an IP address of the NVE, the NVO3 encapsulated packet further includes a virtual network identifier (VN ID), the VN ID is an MPLS VPN label advertised by the PE device, and the MPLS VPN label can be used to identify the VPN to which the CE device belongs; the ASBR further includes a generating module, configured to generate a packet, where the generated packet carries two layers of MPLS labels, the MPLS label allocated by the ASBR in the MPLS network is used as an outer label in the two layers of MPLS labels, the VN ID is used as an inner label in the two layers of MPLS labels, the generated packet does not include the outer destination address and the outer source address, and the generated packet further carries a payload of the NVO3 encapsulated packet; and the sending module is further configured to send the generated packet to the ASBR in the MPLS network.

In one aspect, the allocation module is further configured to allocate an MPLS label for an identifier of the NVE; the sending module is further configured to send a BGP packet to the ASBR in the MPLS network, where the BGP packet sent by the ASBR in the MPLS network carries the identifier of the NVE and the MPLS label allocated for the identifier of the NVE; and the storage module is further configured to store a correspondence between the identifier of the NVE and the MPLS label allocated for the identifier of the NVE.

In one aspect, the receiving module is further configured to receive a packet forwarded by the ASBR in the MPLS network, where the packet forwarded by the ASBR in the MPLS network is from the PE device, an inner label of the packet forwarded by the ASBR in the MPLS network is a VN ID of a virtual network to which the TES belongs, and an outer label of the packet forwarded by the ASBR in the MPLS network is the MPLS label allocated for the identifier of the NVE; the generating module is further configured to generate an NVO3 encapsulated packet, where an outer destination address of the generated NVO3 encapsulated packet is the IP address of the NVE, an outer source address of the generated NVO3 encapsulated packet is an IP address of the ASBR in the NVO3 network, the generated NVO3 encapsulated packet further carries the VN ID of the virtual network to which the TES belongs, and the generated NVO3 encapsulated packet further carries a payload of the packet forwarded by the ASBR in the MPLS network; and the sending module is further configured to send the generated NVO3 encapsulated packet to the NVE.

Another aspect of the invention provides a network virtualization edge (NVE), where a network virtualization over layer 3 (NVO3) network is deployed in a first autonomous system (AS), a multiprotocol label switching MPLS network is deployed in a second AS, and the NVE is applied to the first AS, and the NVE includes: a receiving module, configured to receive routing information sent by an autonomous system border router ASBR in the NVO3 network, where the routing information includes a correspondence between an IP address and an identifier that is of a provider edge PE device in the MPLS network, the IP address is allocated by the ASBR in the NVO3 network to the PE device from a local address pool, and is used as an outer destination address of an NVO3 encapsulated packet sent by a tenant end system TES connected to the NVE to a customer edge CE device connected to the PE device, and the tenant end system TES connected to the NVE and the customer edge CE device connected to the PE device belong to a same virtual private network VPN, where the receiving module is further configured to receive an MPLS VPN label advertised by the PE device and an identifier of the CE device, where the MPLS VPN label is used to identify the VPN to which the CE device belongs; and a routing module, configured to generate VPN routing information, where the VPN routing information includes the identifier of the CE device, the allocated IP address, and a VN ID, the VN ID is the MPLS VPN label, and the allocated IP address is used as an outer destination address of NVO3 encapsulation.

In one aspect, the receiving module is further configured to receive a packet sent by the TES to the PE device, where the packet sent to the PE device carries the identifier of the CE device; a generating module, configured to perform NVO3 encapsulation on the packet sent by the TES to the PE device, to generate an NVO3 encapsulated packet, where an outer destination address of the NVO3 encapsulated packet is the allocated IP address, an outer source address of the NVO3 encapsulated packet is an IP address of the NVE, the NVO3 encapsulated packet further includes a VN ID, the VN ID is the MPLS VPN label advertised by the PE device, and the MPLS VPN label is used to identify the VPN to which the CE device belongs; and a sending module, configured to send the NVO3 encapsulated packet to the ASBR in the NVO3 network.

In one aspect, the NVE further includes: a routing sending module, configured to send VPN route to the PE device, where the VPN route carries an MPLS VPN label and an identifier of the TES, and the MPLS VPN label carried in the VPN route is a VN ID of a virtual network to which the TES belongs.

In one aspect, the receiving module is further configured to receive an NVO3 encapsulated packet sent by the ASBR in the NVO3 network, where an outer destination address of the NVO3 encapsulated packet received by the NVE is an IP address of the NVE, an outer source address of the NVO3 encapsulated packet received by the NVE is an IP address of the ASBR in the NVO3 network, and the NVO3 encapsulated packet received by the NVE further carries the VN ID of the virtual network to which the TES belongs; and the sending module is further configured to decapsulate the received NVO3 encapsulated packet, and send a decapsulated packet to the TES in the NVO3 network according to the VN ID of the virtual network to which the TES belongs.

Another aspect of the invention provides a computer network device, where the computer device includes a processor, a memory, a bus, and a communications interface, where the memory is configured to store a computer execution instruction, the processor and the memory are connected by using the bus, and when the computer device runs, the processor executes the computer execution instruction stored in the memory, so that the computer device executes the method for implementing communication between an NVO3 network and an MPLS network according to one aspect of the invention, or the method for implementing communication between an NVO3 network and an MPLS network according to another aspect of the invention.

As can be seen from the foregoing, the foregoing technical solutions are used in the embodiments of the invention, so that:

Compared with a conventional OPTION C inter-AS solution, when an ASBR in an NVO3 network receives an MPLS label allocated by an ASBR in an MPLS network to a PE device in the MPLS network, the ASBR in the NVO3 network no longer continues to allocate an MPLS label to the PE device; and instead, allocates an IP address from a local address pool to replace the MPLS label, and generates a correspondence (that is, a switching entry) between the IP address and the MPLS label, which is used to forward a traffic packet in a direction from the NVO3 network to the MPLS network, that is: the MPLS label allocated by the ASBR in the MPLS network is used as an outer label of a packet sent by the ASBR in the NVO3 network to the PE device, and the allocated IP address is used as an outer destination address of an NVO3 encapsulated packet sent by a TES in the MPLS network to a CE device in the MPLS network.

Therefore, the following technical effects are achieved:

In various embodiments, by means of conversion between NVO3 encapsulation and label encapsulation on the ASBR in the NVO3 network, inter-AS communication between the NVO3 network and the MPLS network is implemented, thereby resolving a problem that a general NVO3 network device does not support label forwarding, and cannot communicate with the MPLS network by using a conventional OPTION C inter-AS solution.

Moreover, in the solutions of the embodiments of the invention, no VPN routing and forwarding (VRF) or subinterface needs to be configured for each VPN on the ASBR, and the ASBR does not need to store or maintain VPN route either, but needs to store and maintain only route to a PE/NVE and a small quantity of MPLS labels and NVO3 encapsulation conversion entries. Therefore, the solutions of the invention can relieve burden of the ASBR, and has relatively good scalability.

BRIEF DESCRIPTION OF DRAWINGS

To describe the technical solutions in the embodiments of the invention more clearly, the following briefly describes the accompanying drawings required for describing the embodiments. The accompanying drawings in the following description show merely some embodiments of the invention, and a person of ordinary skill in the art may still derive other drawings from these accompanying drawings without creative efforts.

DESCRIPTION OF EMBODIMENTS

Embodiments of the invention provide a method for implementing communication between an NVO3 network and an MPLS network, and an apparatus, to implement inter-AS communication between the NVO3 network and the MPLS network.

To make a person skilled in the art understand the technical solutions in the invention better, the following clearly describes the technical solutions in the embodiments of the invention with reference to the accompanying drawings in the embodiments of the invention. The described embodiments are merely some but not all of the embodiments of the invention. All other embodiments obtained by a person of ordinary skill in the art based on the embodiments of the invention without creative efforts shall fall within the protection scope of the invention.

Detailed descriptions are separately provided in the following by means of specific embodiments.

Embodiment 1

Figure 1:
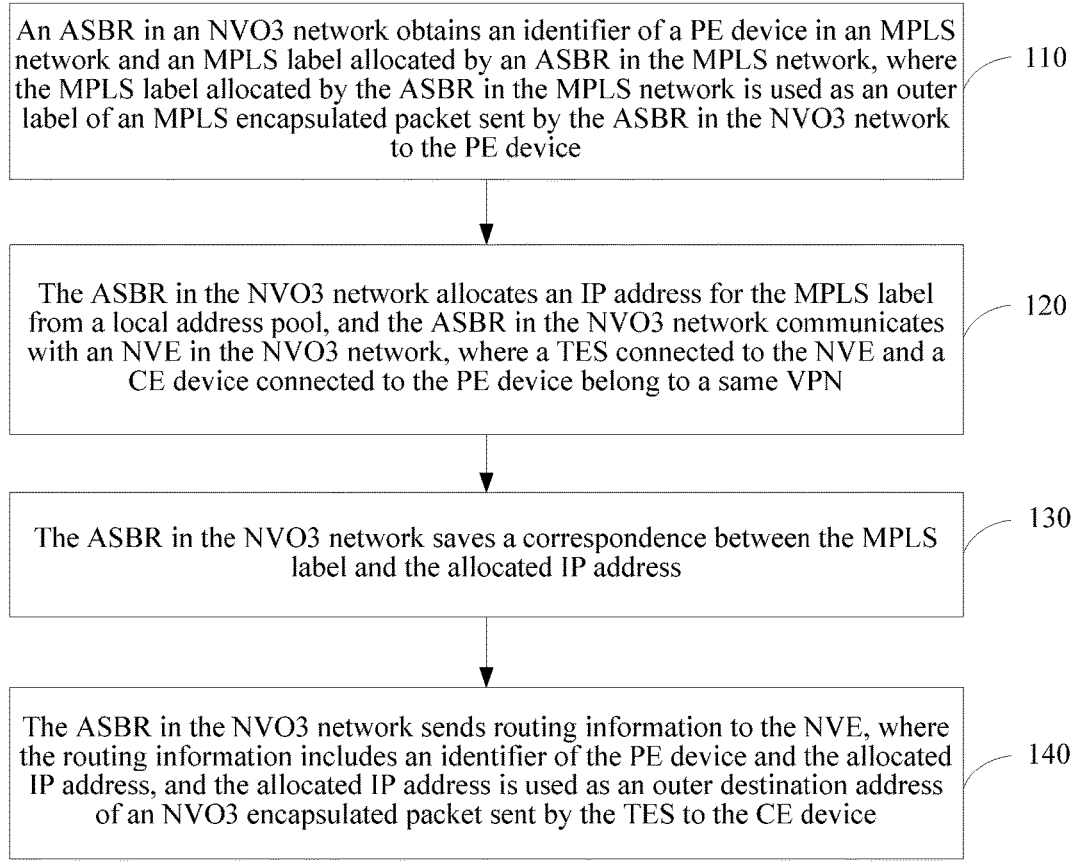
FIG. 1 is a flowchart of a method for implementing communication between an NVO3 network and an MPLS network according to one embodiment of the invention.

Referring to FIG. 1, this embodiment of the invention provides a method for implementing communication between an NVO3 network and an MPLS network. The method is used for communication between the NVO3 network and the MPLS network. The NVO3 network is deployed in a first autonomous system, and the MPLS network is deployed in a second autonomous system. The method may include:

At block 110, an ASBR in the NVO3 network obtains an identifier of a PE device in the MPLS network and an MPLS label allocated by an ASBR in the MPLS network, where the MPLS label allocated by the ASBR in the MPLS network is used as an outer label of an MPLS encapsulated packet sent by the ASBR in the NVO3 network to the PE device.

At block 120, the ASBR in the NVO3 network allocates an IP address for the MPLS label from a local address pool, and the ASBR in the NVO3 network communicates with an NVE in the NVO3 network, where a TES connected to the NVE and a CE device connected to the PE device belong to a same VPN.

At block 130, the ASBR in the NVO3 network stores a correspondence between the MPLS label and the allocated IP address.

At block 140, the ASBR in the NVO3 network sends routing information to the NVE, where the routing information includes an identifier of the PE device (e.g., an IP address of the PE itself) and the allocated IP address, and the allocated IP address is used as an outer destination address of an NVO3 encapsulated packet sent by the TES to the CE device.

As can be seen from the foregoing, in this embodiment of the invention, compared with a conventional MPLS Option C inter-AS interconnection solution, when an ASBR in an NVO3 network receives an MPLS label allocated by an ASBR in an MPLS network to a PE device, the ASBR in the NVO3 network no longer continues to allocate an MPLS label to the PE device; and instead, allocates an IP address from a local address pool to replace the MPLS label, and generates a switching entry between the IP address and the MPLS label, which is used to forward a traffic packet in a direction from the NVO3 network to the MPLS network, that is: the MPLS label allocated by the ASBR in the MPLS network is used as an outer label of a packet sent by the ASBR in the NVO3 network to the PE device, and the allocated IP address is used as an outer destination address of an NVO3 encapsulated packet sent by a TES in the MPLS network to a CE device in the MPLS network. As can be seen, in VPN inter-AS interconnection communication between the NVO3 network and the MPLS network, in the NVO3 network, NVO3 encapsulation is used to replace label encapsulation (that is, MPLS encapsulation) in the conventional MPLS Option C inter-AS.

Therefore, the aspects of the invention achieve the following technical effects:

In various embodiments, by means of conversion between NVO3 encapsulation and label encapsulation on the ASBR in the NVO3 network, inter-AS communication between the NVO3 network and the MPLS network is implemented, thereby resolving a problem that a general NVO3 network device does not support label forwarding, and cannot communicate with the MPLS network by using a conventional OPTION C inter-AS solution.

Moreover, in the aspects of this embodiment of the invention, no VRF or subinterface needs to be configured for each VPN on the ASBR, and the ASBR does not need to store or maintain VPN route either, but needs to store and maintain only route to a PE/NVE and a small quantity of MPLS labels and NVO3 encapsulation conversion entries. Therefore, the aspects of the invention can relieve burden of the ASBR, and has relatively good scalability.

Embodiment 2

Figure 2:
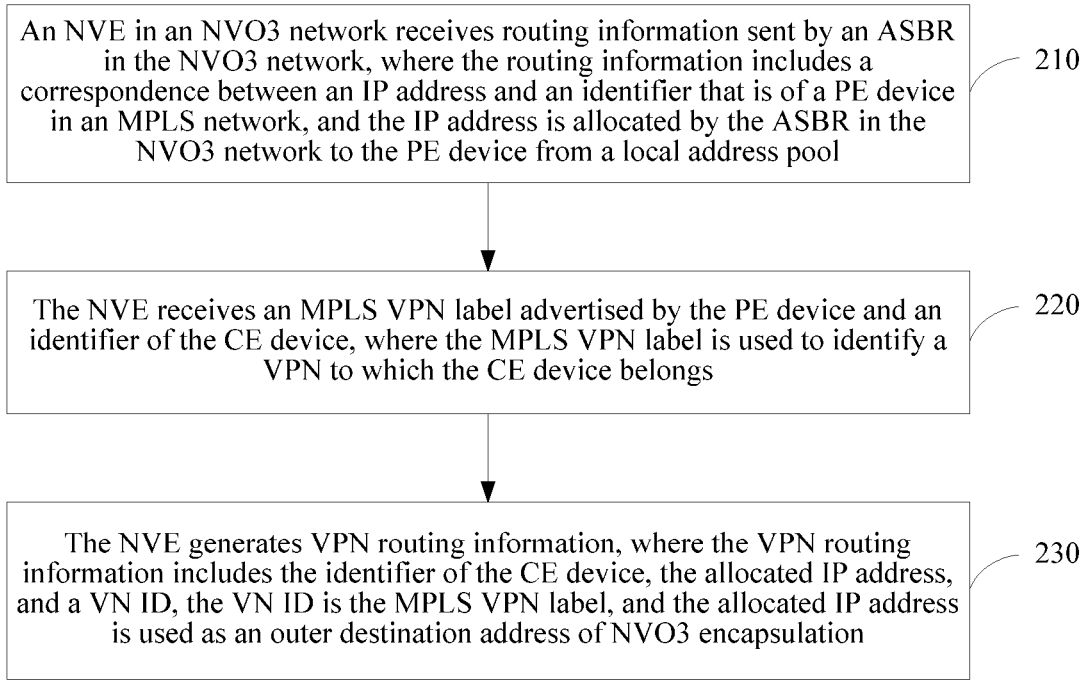
FIG. 2 is a flowchart of a method for implementing communication between an NVO3 network and an MPLS network according to one embodiment of the invention.

Referring to FIG. 2, this embodiment of the invention provides another method for implementing communication between an NVO3 network and an MPLS network. The method is used for communication between the NVO3 network and the MPLS network. The NVO3 network is deployed in a first autonomous system, and the MPLS network is deployed in a second autonomous system. The method may include:

At block 210, an NVE in the NVO3 network receives routing information sent by an ASBR in the NVO3 network, where the routing information includes a correspondence between an IP address and an identifier that is of a PE device in the MPLS network. The IP address is allocated by the ASBR in the NVO3 network to the PE device from a local address pool, and is used as an outer destination address of an NVO3 encapsulated packet sent by a tenant end system TES connected to the NVE to a customer edge CE device connected to the PE device, and the tenant end system TES connected to the NVE and the customer edge CE device connected to the PE device belong to a same virtual private network VPN.

At block 220, the NVE receives an MPLS VPN label advertised by the PE device and an identifier of the CE device, where the MPLS VPN label may be used to identify the VPN to which the CE device belongs.

At block 230, the NVE generates VPN routing information, where the VPN routing information includes the identifier of the CE device, the allocated IP address, and a VN ID, the VN ID is the MPLS VPN label, and the allocated IP address is used as an outer destination address of NVO3 encapsulation.

As can be seen from the foregoing, in this embodiment of the invention, compared with a conventional MPLS Option C inter-AS interconnection solution, when an ASBR in an NVO3 network receives an MPLS label allocated by an ASBR in an MPLS network to a PE device, the ASBR in the NVO3 network no longer continues to allocate an MPLS label to the PE device; instead, allocates an IP address from a local address pool to replace the MPLS label, generates a switching entry between the IP address and the MPLS label, and sends routing information that includes a correspondence between the IP address and the MPLS label to an NVE in the NVO3 network, and the NVE can further acquire an MPLS VPN label advertised by the PE device in the MPLS network and an identifier of a CE device, so that the NVE can generate VPN routing information that includes the identifier of the CE device, the allocated IP address, and a VN ID (that is, the MPLS VPN label), and the NVE can perform, according to the VPN routing information, NVO3 encapsulation on a packet sent by a TES in the NVO3 network to the CE device in the MPLS network, that is, during VPN inter-AS interconnection communication between the NVO3 network and the MPLS network, in the NVO3 network, NVO3 encapsulation is used to replace label encapsulation in the conventional MPLS Option C inter-AS.

Therefore, the aspects of the invention achieve the following technical effects:

In various embodiments, by means of conversion between NVO3 encapsulation and label encapsulation on the ASBR in the NVO3 network, inter-AS communication between the NVO3 network and the MPLS network is implemented, thereby resolving a problem that a general NVO3 network device does not support label forwarding, and cannot communicate with the MPLS network by using a conventional OPTION C inter-AS solution.

Moreover, in the solutions of the invention, no VRF or subinterface needs to be configured for each VPN on the ASBR, and the ASBR does not need to store or maintain VPN route either, but needs to store and maintain only route to a PE/NVE and a small quantity of MPLS labels and NVO3 encapsulation conversion entries. Therefore, the solutions of the invention can relieve burden of the ASBR, and has relatively good scalability.

Embodiment 3

A method for communication between an NVO3 network and an MPLS network may be classified into a control plane solution and a data plane solution. Moreover, the data plane may include two directions, that is, an uplink direction from the NVO3 network to the MPLS network and a downlink direction from the MPLS network to the NVO3 network.

In this embodiment, with reference to a specific network architectural diagram, the aspects of the invention are specifically described from the control plane, the data plane, and different directions respectively.

FIG. 3a to FIG. 3d are network architectural and schematic communication diagrams of this embodiment. A network architecture includes: a first AS (AS1) and a second AS (AS2), where an NVO3 network is deployed in the first AS, and an MPLS network is deployed in the second AS. An ASBR (represented as an ASBR1 in the figure) in the NVO3 network communicates with an NVE, and the NVE is connected to, for example, two TESs, that is, a TES1 and a TES2. An ASBR (represented as an ASBR2 in the figure) in the MPLS network communicates with a PE device, and the PE device is connected to, for example, two CE devices, that is, a CE1 and a CE2. The TES1 and the CE1 belong to a same VPN, which is represented as a VPN1; and the TES2 and the CE2 belong to a same VPN, which is represented as a VPN2.

It is set that an Interior Border Gateway Protocol (IBGP) session is established between the NVE and the ASBR1 in the NVO3 network to exchange routing information. An IBGP session is also established between the ASBR2 in the MPLS network and a PE2 to exchange routing information. An External Border Gateway Protocol (EBGP) session is established between the ASBR1 and the ASBR2 to exchange routing information. An MP-EBGP session is directly established between the NVE and the PE to exchange VPN route, and the NVE and the PE allocate and advertise VPN label information for each other. A Label Distribution Protocol (LDP) protocol may be deployed in the MPLS network to distribute labels for Interior Gateway Protocol (IGP) route.

A1. A control plane solution for a packet in an uplink direction may include:

A101. Each node device in the MPLS network sequentially allocates an MPLS label (that is, a BGP MPLS public network label) to a PE, and advertises the MPLS label to a next-hop node device.

Figure 3A:
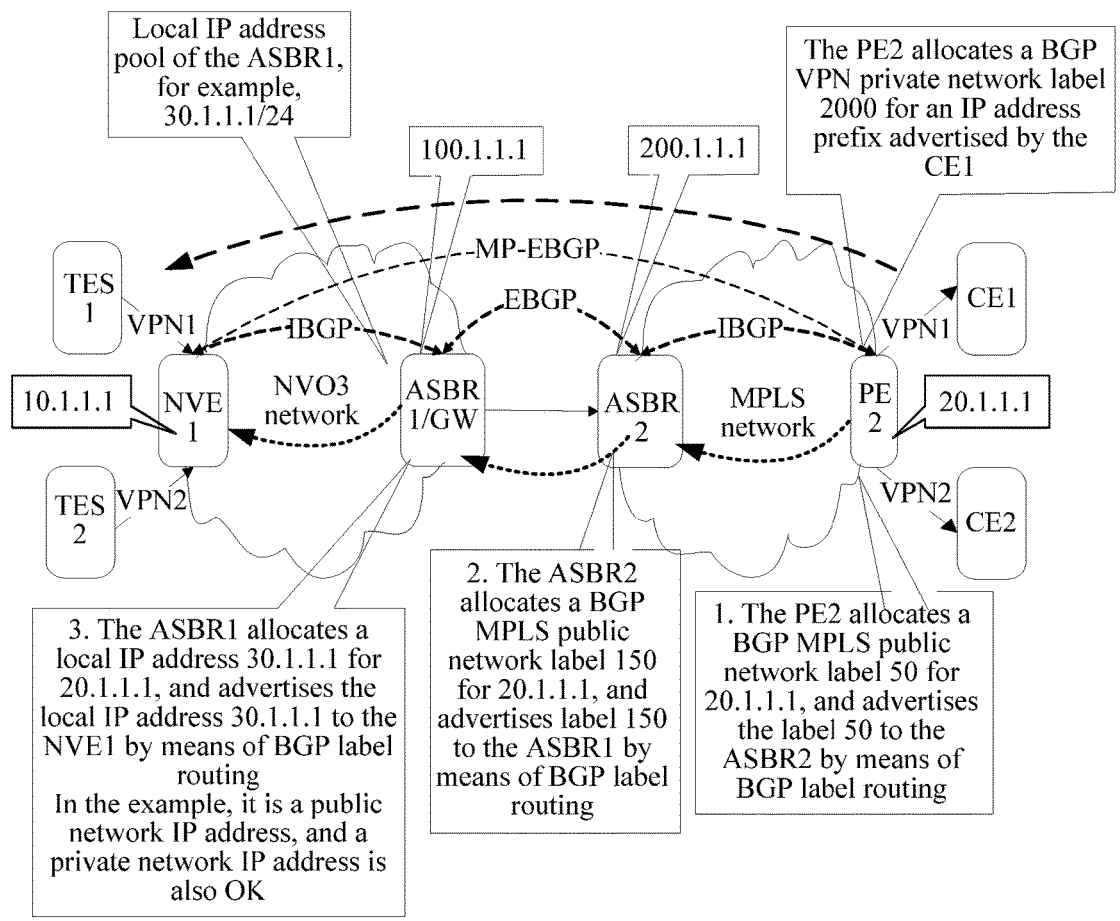
FIG. 3a to FIG. 3d are network architectural and schematic communication diagrams according to one embodiment of the invention.

For example, referring to FIG. 3a, it is assumed that: An IP address of a PE (that is, a PE2 in the figure) is 20.1.1.1, an IP address of the ASBR2 is 200.1.1.1, an IP address of the ASBR1 is 100.1.1.1, and an IP address of the NVE is 10.1.1.1. It is assumed that: The PE allocates an MPLS label 50 for 20.1.1.1, and advertises the MPLS label 50 to the ASBR2 by way of BGP label routing; and the ASBR2 allocates an MPLS label 150 for the IP address 20.1.1.1 of the PE, and advertises the MPLS label 150 to the ASBR1 by way of BGP label routing.

A102. The ASBR (that is, the ASBR1) in the NVO3 network obtains an identifier of a PE device in the MPLS network and an MPLS label allocated by the ASBR (that is, the ASBR2) in the MPLS network, and allocates an IP address for the MPLS label from a local address pool. In some embodiments of the invention, the allocation step may specifically include: receiving, by the ASBR1, a BGP packet sent by the ASBR2 in the MPLS network, where the BGP packet carries the identifier of the PE device and the MPLS label allocated by the ASBR2. The MPLS label allocated by the ASBR (ASBR2) in the MPLS network is used as an outer label of an MPLS encapsulated packet sent by the ASBR (ASBR1) in the NVO3 network to the PE device. The identifier of the PE device may be specifically an IP address of the PE device. Moreover, the ASBR1 may further store a correspondence between the MPLS label allocated by the ASBR2 and the IP address allocated by the ASBR1, and generate a forwarding entry that is of the IP address allocated by the ASBR1 and the MPLS label allocated by the ASBR2 and that is in an outbound direction (from the NVO3 network side to the MPLS network side, that is, an uplink direction).

Referring to FIG. 3a, it is assumed that an IP address allocated by the ASBR1 for 20.1.1.1 is 30.1.1.1.

A103. The ASBR1 sends routing information to the NVE (that is, the NVE1 in the figure), where the routing information includes the identifier of the PE device, the allocated IP address, and a correspondence between the identifier of the PE device and the allocated IP address, and the allocated IP address is used as an outer destination address of an NVO3 encapsulated packet sent by a TES to a CE device.

Optionally, routing information of multiple PE devices may be carried in one routing message.

Referring to FIG. 3a, the ASBR1 may advertise the routing information to the NVE by way of BGP label routing, where the routing information includes the IP address 20.1.1.1 of the PE, and the IP address 30.1.1.1 (which, for example, may be specifically 30.1.1.1/24) allocated by the ASBR1.

The ASBR1 may define, for the NVE, a new routing attribute type, a BGP extended community attribute, or a new type of NLRI (network layer reachability information, network layer reachability information), or use one of two attributes: a defined IPv4 Address Specific Extended Community or an Opaque Extended Community, to carry a local IP address allocated to the PE2, where the local IP address may be an IPv4 address or may be an IPv6 address. The new type of NLRI may include one or more <length, NVO3 Tunnel IP, prefix> triplets, which are carried in an attribute MP_REACH_NLRI or MP_UNREACH_NLRI, where the length represents lengths of an NVO3 Tunnel IP and a prefix that are in the triplet, the NVO3 Tunnel IP is a local IP address allocated to a PE, and the prefix is an IP address prefix corresponding to a PE identifier.

A104. The PE allocates an MPLS VPN label for an identifier advertised by the CE1, for example, an IP address prefix or a MAC address of the CE1, where the MPLS VPN label is used to identify a VPN (that is, the VPN1) to which the CE1 device belongs; and advertises the allocated MPLS VPN label and the identifier advertised by the CE1, for example, the IP address prefix or the MAC address of the CE1, to the NVE. The NVE receives the MPLS VPN label advertised by the PE device and an identifier (for example, the IP address prefix or the MAC address of the CE1) of the CE device advertised by the CE, where the MPLS VPN label may be used to identify a VPN to which the CE device belongs, or an interface of the CE device connected to the PE device, or the identifier of the CE device. Then, the NVE may generate VPN routing information, that is: import the identifier of the CE device advertised by the PE, for example, the IP address prefix or the MAC address of the CE device, into a local VPN routing and forwarding table, where the VPN routing information includes the identifier of the CE device (for example, the IP address prefix or the MAC address of the CE device), the allocated IP address, and a VN ID, the VN ID is the MPLS VPN label, and the allocated IP address is used as an outer destination address of NVO3 encapsulation.

Specifically, the NVE may iterate (iterate) according to the identifier of the PE to obtain an outer destination address (the IP address) of an NVO3 tunnel of the IP address prefix or the MAC address of the CE device, use the MPLS VPN label as a VN ID of the NVO3 tunnel, and generate a local VPN routing and forwarding table, where a destination of the NVO3 tunnel is an IP address allocated by the ASBR1 from the local address pool, a source address is an IP address of the NVE, and the VN ID is the MPLS VPN label advertised by the PE.

Referring to FIG. 3a, it is assumed that an MPLS VPN label that is allocated by the PE and that is used to identify the VPN1 is 2000.

A2. A data plane solution for a packet in an uplink direction may include:

A201. An NVE receives a packet sent by a TES1 to a CE device, where the packet sent to the PE device carries an identifier of the CE device; searches a VPN routing and forwarding table; then performs NVO3 encapsulation, to generate an NVO3 encapsulated packet.

Figure 3B:
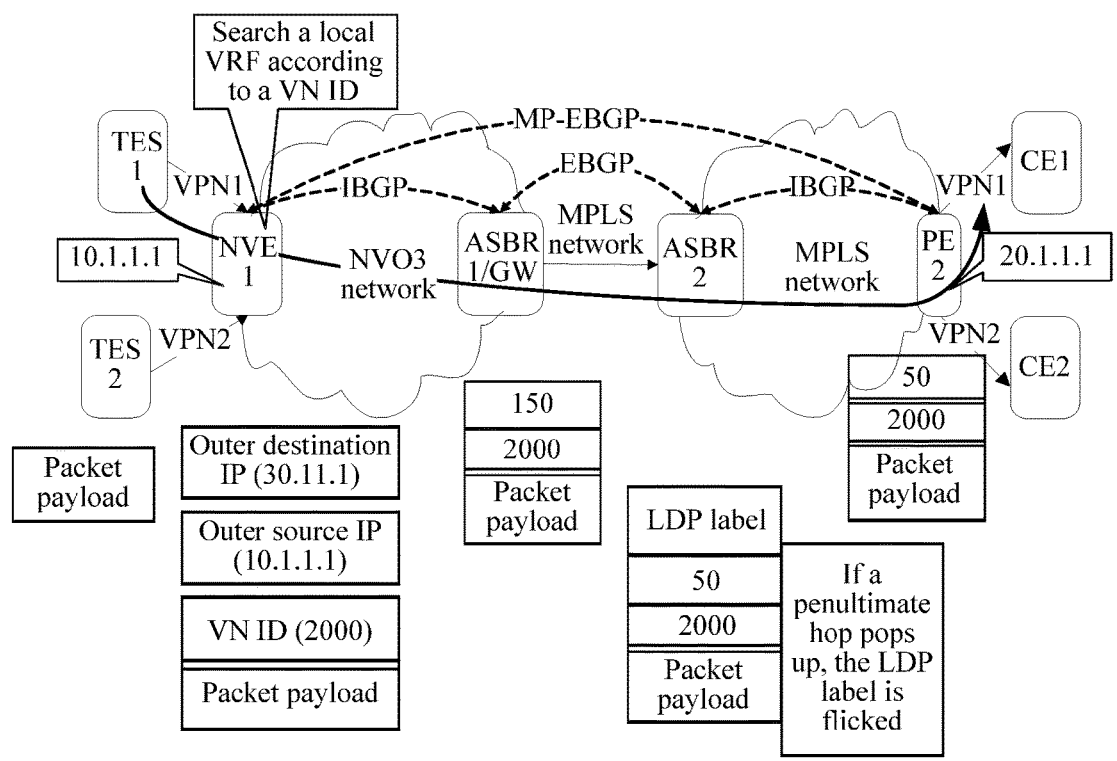

Referring to FIG. 3b, in the figure, a packet payload is used to represent the packet sent by the TES1 to the CE device. The NVE performs NVO3 encapsulation on the packet payload, to generate the NVO3 encapsulated packet, where an outer destination address of the NVO3 encapsulated packet is the allocated IP address (for example, 30.1.1.1), an outer source address of the NVO3 encapsulated packet is an IP address (for example, 10.1.1.1) of the NVE, the NVO3 encapsulated packet further includes a VN ID, the VN ID is an MPLS VPN label (for example, 2000) advertised by the PE, and the MPLS VPN label may be used to identify a VPN (that is, the VPN1) to which the CE device belongs. The NVE searches the VPN routing and forwarding table according to the VN ID, and sends the NVO3 encapsulated packet to the ASBR1.

A202. The ASBR1 receives the NVO3 encapsulated packet sent by the NVE, and generates a label encapsulated (that is, MPLS encapsulated) packet.

The outer destination address of the NVO3 encapsulated packet is the allocated IP address, the outer source address of the NVO3 encapsulated packet is the IP address of the NVE, the NVO3 encapsulated packet further includes the VN ID, the VN ID is the MPLS VPN label advertised by the PE device, and the MPLS VPN label may be used to identify the VPN to which the CE device belongs.

The ASBR1 decapsulates the NVO3 encapsulated packet, searches for a corresponding MPLS label (that is, an MPLS label, for example, 150, allocated by the ASBR2) according to the allocated IP address (for example, 30.1.1.1); and performs label encapsulation (that is. MPLS encapsulation) on a packet payload obtained through decapsulation, to obtain a label encapsulated packet, where the label encapsulated packet carries two layers of MPLS labels, the MPLS label (for example, 150) allocated by the ASBR2 in the MPLS network is used as an outer label in the two layers of MPLS labels, the VN ID (for example, 2000) is used as an inner label in the two layers of MPLS labels, the generated label encapsulated packet does not include the outer destination address or the outer source address, and the generated label encapsulated packet further carries a payload of the NVO3 encapsulated packet. The ASBR1 sends, according to an indication of the MPLS label (for example, 150) allocated by the ASBR2, the generated label encapsulated packet to the ASBR2.

A203. The ASBR2 receives the label encapsulated packet sent by the ASBR1, converts the packet into a layer 3 label encapsulated packet, and sends the layer 3 label encapsulated packet to the PE, and the PE removes all label encapsulations, and sends a packet payload to the CE1.

The layer 3 label encapsulated packet includes three layers of labels, where an outermost label is an LDP label, a middle label is an MPLS label (for example, 50, that is, a BGP MPLS public network label) allocated by the PE, and an inner label is a VN ID (for example, 2000). For a solution of label forwarding from the ASBR2 to the CE1, refer to the conventional Option C solution, and details are not described herein.

B1. A control plane solution for a packet in a downlink direction may include:

B101. The ASBR1 in the NVO3 network allocates an MPLS label (which is specifically a BGP MPLS public network label) for an identifier of each NVE in the NVO3 network, adds the MPLS label allocated by the ASBR1 for the identifier of the NVE and an identifier of the corresponding NVE to a BGP packet, and sends the BGP packet to the ASBR2 in the MPLS network. The ASBR1 may further store a correspondence between the identifier of the NVE and the MPLS label allocated for the identifier of the NVE, and generate a forwarding entry (from the MPLS network side to the NVO3 network side) corresponding to the identifier of the NVE and the MPLS label allocated by the ASBR1 for the identifier of the NVE, where the identifier of the NVE may be specifically an IP address of the NVE, for example, an IPv4 address or an IPv6 address.

Figure 3C:
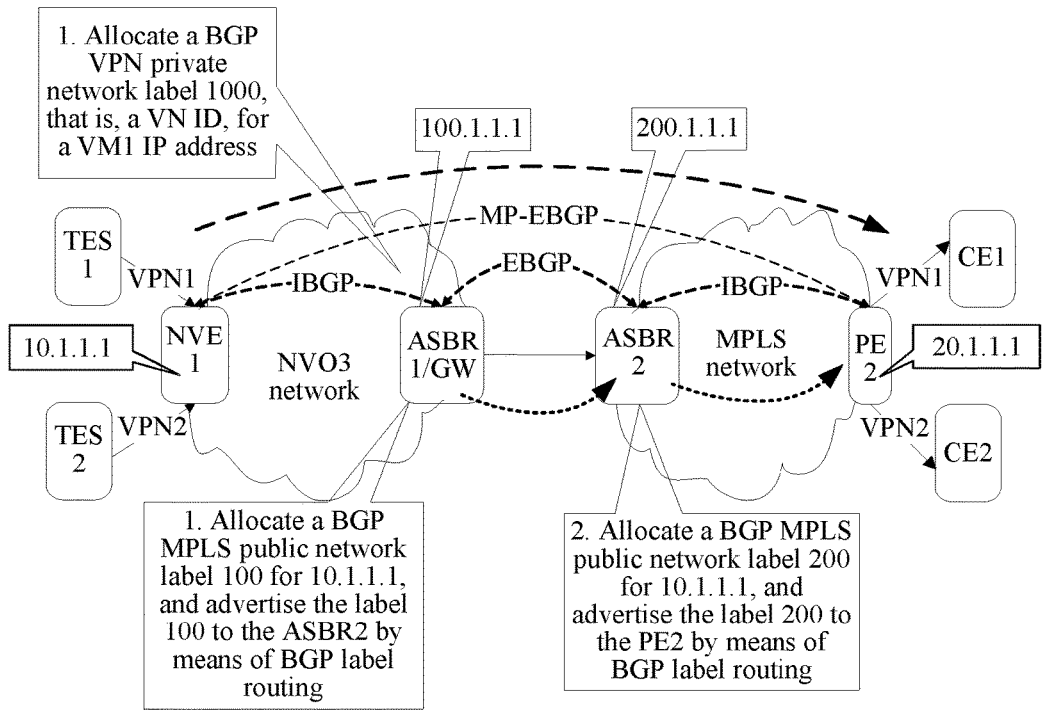

For example, referring to FIG. 3c, in this specification, it is assumed that: An IP address of the PE is 20.1.1.1, an IP address of the ASBR2 is 200.1.1.1, an IP address of the ASBR1 is 100.1.1.1, and an IP address of the NVE is 10.1.1.1. It is assumed that a second MPLS label allocated by the ASBR1 for the identifier 10.1.1.1 of the NVE is 100, and the second MPLS label is advertised to the ASBR2 by means of BGP label routing.

B102. The ASBR2 receives the BGP packet sent by the ASBR1, and allocates the MPLS label.

For example, referring to FIG. 3c, it is assumed that the ASBR2 allocates the MPLS label 200 for the identifier 10.1.1.1 of the ASBR1, and advertises the MPLS label 200 to the PE2 by means of BGP label routing.

B103. The NVE sends VPN route to the PE device, where the VPN route carries an identifier of a TES and an MPLS VPN label, and the MPLS VPN label carried in the VPN route is an identifier VN ID of the NVO3 network to which the TES belongs. In some embodiments, to ensure that the VN ID can be correctly converted into the MPLS VPN label, a length of the VN ID cannot exceed 20 bits (bits), that is, a VN ID value used for interconnection between the NVO3 network and the MPLS network cannot be greater than 2 raised to the power of 20 (1, 048, 576). Optionally, the identifier of the TES may be an IP address prefix or a MAC address of the TES. After receiving the VPN route, the PE device may import the carried IP address prefix or MAC address of the TES into a local L2/L3 VPN forwarding table.

For example, referring to FIG. 3c, the NVE allocates an MPLS VPN label 1000 for an IP address of the TES1, where the MPLS VPN label is a VN ID of an NVO3 virtual network.

B2. A data plane solution for a packet in a downlink direction may include:

B201. The PE receives a packet sent by the CE1 to the TES1, performs layer 3 label encapsulation on the packet sent by the CE1 to the TES1, and sends an encapsulated packet to the ASBR2, and the ASBR2 converts layer 3 label encapsulation into layer 2 label encapsulation, generates a layer 2 label encapsulated packet, and sends the layer 2 label encapsulated packet to the ASBR1.

Figure 3D:
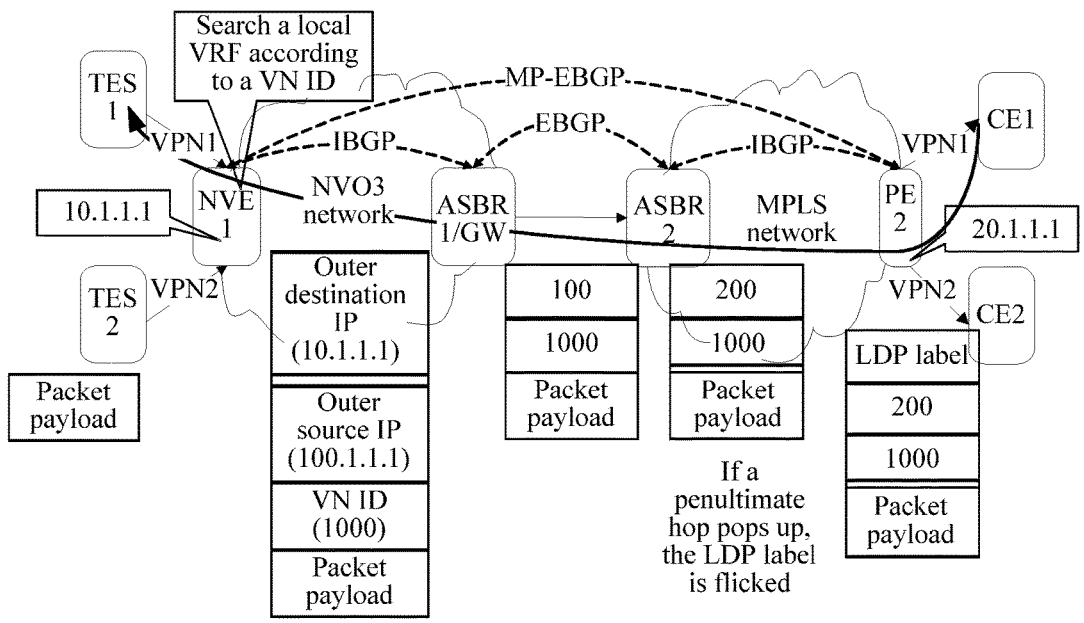

For example, referring to FIG. 3d, the label encapsulated packet generated by the PE includes three layers of labels, where an outermost label is an LDP label, a middle label is an MPLS label (for example, 200, that is, a BGP MPLS public network label) allocated by the ASBR2, and an inner label is a VN ID (for example, 1000) of a virtual network to which the TES1 belongs. The label encapsulated packet generated by the ASBR2 includes two layers of labels, where an inner label is the VN ID (for example, 1000) of the virtual network to which the TES1 belongs, and an outer label is an MPLS label (for example, 100) allocated by the ASBR1 for the identifier of the NVE. It should be noted that, for a solution of label forwarding from the CE1 to the ASBR2, refer to the conventional Option C solution, and details are not described herein.

B202. The ASBR1 receives the label encapsulated packet sent by the ASBR2, decapsulates the label encapsulated packet to obtain a packet payload, and performs NVO3 encapsulation on the packet payload, to generate an NVO3 encapsulated packet.

The inner label in the packet forwarded by the ASBR2 in the MPLS network is a VN ID (for example, 1000) of a virtual network to which the TES belongs, and an outer label of the packet forwarded by the ASBR2 in the MPLS network is the MPLS label (for example, 100) allocated for the identifier of the NVE.

An outer destination address of the NVO3 encapsulated packet is an IP address (for example, 10.1.1.1) of the NVE, an outer source address is an IP address (for example, 100.1.1.1) of the ASBR1 in the NVO3 network, and the NVO3 encapsulated packet further carries the VN ID (for example, 1000) of the virtual network to which the TES belongs. Certainly, the NVO3 encapsulated packet further carries a payload of the packet forwarded by the ASBR1 in the MPLS network. The ASBR1 sends the generated NVO3 encapsulated packet to the NVE.

B203. The NVE receives the NVO3 encapsulated packet sent by the ASBR1, decapsulates the NVO3 encapsulated packet, and sends a packet obtained through decapsulation to the TES in the NVO3 network according to the VN ID of the virtual network to which the TES belongs.

For example, as shown in FIG. 3d, after receiving the NVO3 encapsulated packet sent by the ASBR1, the NVE may search a local VRF according to the VN ID (for example, 1000), determine a receive end TES1, decapsulate the packet, and send a packet payload to the TES1.

The foregoing describes the technical solutions of this embodiment of the invention in detail with reference to the shown network architectural diagrams 3a to 3d. However, it should be understood that, FIG. 3a to FIG. 3d are only some aspects of the invention, but are not used to limit the invention.

As can be seen from the foregoing:

In some embodiments of the invention, a local address pool may be deployed on the ASBR1 in the NVO3 network. An address resource of the local address pool may be effective only in the NVO3 network, but no corresponding route is advertised to an external network, that is, the local IP address pool may be an IP address of a private address network segment. However, it should be understood that, the local IP address pool may also be an IP address of a public network address network segment. The ASBR1 may propagate, by means of propagation of a BGP/IGP protocol, IP prefix routing corresponding to the local address pool to a routing neighbor inside the NVO3 network, so that each network device inside the NVO3 network knows the IP prefix routing corresponding to the local address pool.

In some embodiments of the invention, the ASBR1 may discover an NVE of a local AS domain by means of local command configuration, NMS (Network Management System, network management system) configuration, or a dynamic protocol, and allocate an MPLS label to the NVE of the local AS domain. The CE device and the TES that is in the NVO3 network belong to a same VPN. It may be understood that, the CE and the TES may implement interconnection by searching a layer 2 MAC forwarding entry or a layer 3 IP routing entry. If interconnection is implemented by means of the MAC, the VPN is an L2 VPN; and if interconnection is implemented by means of the IP, the VPN is an L3 VPN. The ASBR1 may store a correspondence or an association (association) between the local IP address allocated to the PE and the identifier of the PE.

In some embodiments of the invention, after obtaining routing information that is sent by the ASBR1 and that carries the correspondence between the identifier of the PE and the local IP address allocated to the PE, the NVE may associates the identifier (for example, a public network IP address) of the PE and the allocated IP address. In this way, when performing NVO3 encapsulation on a packet sent by a tenant end system in the NVO3 network to the PE, the NVE in the NVO3 network may use the local IP address allocated to the PE as a destination address in an outer IP header of NVO3 encapsulation.

In some embodiments of the invention, with reference to the conventional MPLS Option C inter-AS interconnection solution, the NVE and the PE directly establish an MP-EBGP session, to exchange VPN information between the NVE or a GW and a remote PE, including: allocating an MPLS VPN label to a peer VPN instance that is discovered by means of local configuration or a BGP AD mechanism, propagating the MPLS VPN label and L2 or L3 routing information to the PE, and receiving the MPLS VPN label and the L2 (MAC) or L3 (IP) routing information that are distributed by the PE.

In some embodiments of the invention, when receiving, from a user side interface, a traffic packet from a TES in the NVO3 network to a CE device in the MPLS network, the NVE may search a forwarding information table of the VPN according to a destination identifier of the packet, obtains information about the PE, and performs NVO3 encapsulation on the packet, where a destination address in an outer IP header of the NVO3 encapsulation is filled with the local IP address allocated to the PE, a source address in an outer IP header is filled with the IP address of the NVE, and the VN ID is filled with the MPLS VPN label advertised by the PE.

In some embodiments of the invention, a network node in the NVO3 network performs forwarding according to a destination address in an outer IP header of the NVO3 encapsulated packet, and after receiving the NVO3 encapsulated packet, the ASBR1 searches for route according to the destination address in the outer IP header to obtain next-hop information obtained by iterating according to route corresponding to a public network IP address of an egress PE, where the next-hop information includes an MPLS label corresponding to the IP address of the PE.

In some embodiments of the invention, the ASBR1 may receive a label encapsulated packet that is from the CE device in the MPLS network to the TES in the NVO3 network. The packet should be encapsulated with two layers of labels, where an outer label is an MPLS label (corresponding to route of an egress NVE), and an inner label is an MPLS VPN label. Then, the ASBR1 may convert the packet encapsulated with two layers of labels into an NVO3 encapsulated packet, and send the NVO3 encapsulated packet to the NVE.

In some embodiments of the invention, after receiving, from a network side interface, an NVO3 encapsulated packet sent by the ASBR1, the NVE may directly peel off the NVO3 encapsulation, and send a packet payload to the TES in the NVO3 network according to a VN ID in the NVO3 encapsulation.

As can be seen from the foregoing, compared with the conventional OPTION C inter-AS solution, in the aspects of this embodiment of the invention, when an ASBR in an NVO3 network receives an MPLS label allocated by an ASBR in an MPLS network to a PE device in the MPLS network, the ASBR in the NVO3 network no longer continues to allocate an MPLS label to the PE device; instead, allocates an IP address from a local address pool to replace the MPLS label, and generates a correspondence (that is, a switching entry) between the IP address and the MPLS label, which is used to forward traffic in a direction from the NVO3 network to the MPLS network. In addition, the ASBR in the NVO3 network allocates an MPLS label to each NVE, advertises a correspondence between the label and an NVE identifier to the ASBR in the MPLS network, and generates a switching entry between the MPLS label and the NVE identifier, which is used to forward traffic in a direction from the MPLS network to the NVO3 network. When performing packet forwarding, the ASBR in the NVO3 network needs to perform mapping on a VN ID in NVO3 data encapsulation and an inner MPLS VPN label in MPLS encapsulation, that is, when a packet is transmitted from the NVO3 to the MPLS network, a VN ID value is copied to an inner label of the MPLS. When the packet is transmitted from the MPLS network to the NVO3 network, the inner MPLS VPN label is copied to the VN ID in the NVO3 data encapsulation.

Therefore, the aspects of this embodiment of the invention achieve the following technical effects:

In the aspects of this embodiment of the invention, no VRF or subinterface needs to be configured for each VPN on the ASBR, and the ASBR does not need to store or maintain VPN route either, but needs to store and maintain only route to PE/NVE and a small quantity of MPLS labels and NVO3 encapsulation conversion entries. Therefore, the aspects of the invention can relieve burden of the ASBR, and has relatively good scalability.

Moreover, in the aspects of this embodiment of the invention, By means of conversion between NVO3 encapsulation and label encapsulation on the ASBR in the NVO3 network, inter-AS communication between the NVO3 network and the MPLS network is implemented, thereby resolving a problem that a general NVO3 network device does not support label forwarding, and cannot communicate with the MPLS network by using a conventional OPTION C inter-AS solution.

Embodiment 4

In this embodiment, with reference to specific network architectural diagrams 4a and 4b, the aspects of the invention are specifically described from a control plane, a data plane, and different directions respectively.

Figure 4A:
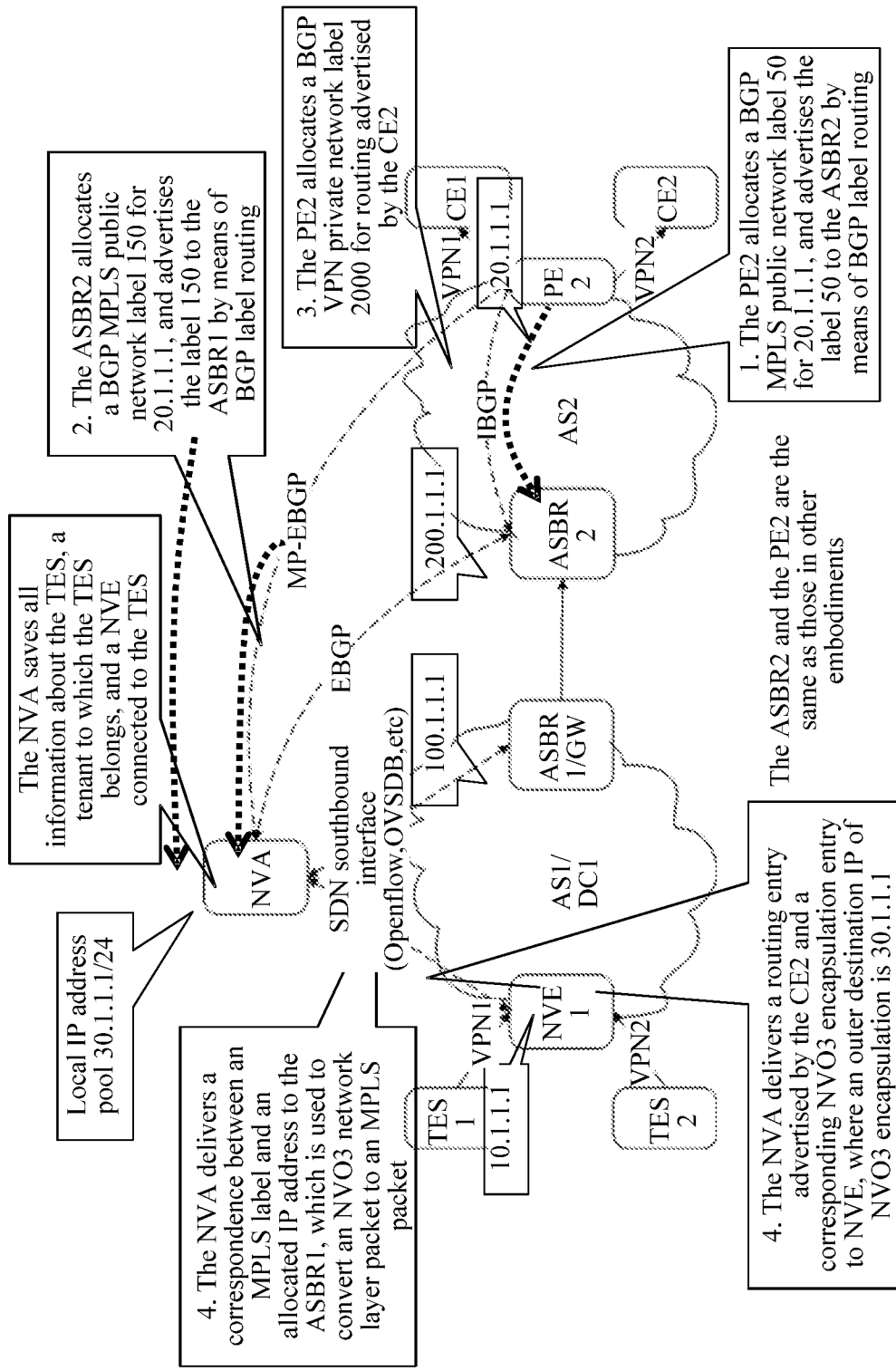
FIG. 4a to FIG. 4b are schematic network architectural diagrams according to one embodiment of the invention.
Figure 4B:
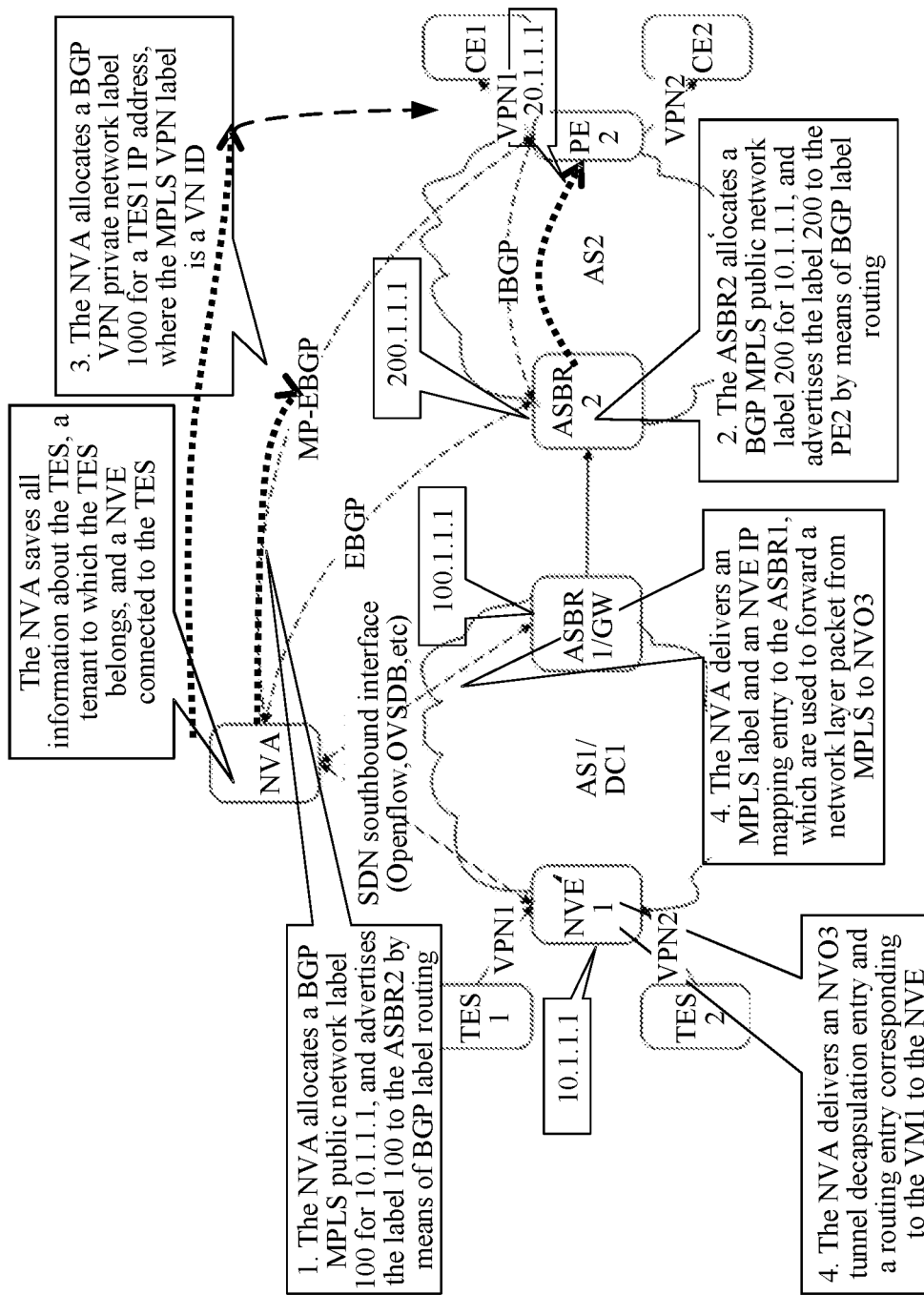

FIG. 4a and FIG. 4b are network architectural diagrams of this embodiment, and a difference from the network structural diagrams shown in FIG. 3a to FIG. 3d in Embodiment 3 lies in: a centralized controller (Network ation Authority, NVA) is added in an NVO3 network, and an AS1 (that is, DC1) deploying the NVO3 network may perform centralized control by using the NVA Controller.

The NVA delivers a routing forwarding entry by using a protocol such as an OpenFlow protocol (or by using an OVSDB (Open vSwtich Database). In the interior of the NVO3 network, a VXLAN (Virtual eXtensible Local Area Network, virtual extensible local area network) may be used to encapsulate and forward a tenant data packet. The NVA stores all information about a TES, a tenant to which the TES belongs, and an NVE connected to the TES.

An EBGP session is established between the NVA and an ASBR2 in an AS2 to exchange public network routing information. A local address pool is configured on the NVA. For a direction from the NVO3 network to an MPLS network, the NVA allocates an MPLS label to each NVE, and advertises a correspondence between an NVE identifier and the MPLS label to an ASBR in the MPLS network; and for a direction from the MPLS network to the NVO3 network, the NVA allocates a local IP address for an MPLS label corresponding to each PE identifier. An MP-EBGP session is established between the NVA and a PE2 to exchange VPN route, and allocate and advertise information about the MPLS VPN label. An IBGP session is still established between the ASBR2 and the PE2 to exchange routing information. An LDP protocol is deployed inside the AS2 to distribute a label for IGP route.

E1. A control plane solution for a packet in an uplink direction may include:

E101. Each node device in the MPLS network sequentially allocates an MPLS label (that is, a BGP MPLS public network label) to a PE, and advertises the MPLS label to a next-hop node device.

This step is the same as step A101 in the embodiment of FIG. 3a. For example, referring to FIG. 4a, it is assumed that: An IP address of the PE is 20.1.1.1, an IP address of the ASBR2 is 200.1.1.1, an IP address of the ASBR1 is 100.1.1.1, and an IP address of the NVE is 10.1.1.1. It is assumed that: The PE allocates an MPLS label 50 for 20.1.1.1, and advertises the MPLS label 50 to the ASBR2 by means of BGP label routing; and the ASBR2 allocates an MPLS label 150 for the IP address 20.1.1.1 of the PE, and advertises the MPLS label 150 to the NVA by means of BGP label routing.

E102. The NVA allocates an IP address to the PE in the MPLS network from a local address pool, and delivers a correspondence between the MPLS label and the allocated IP address to the ASBR1, which is used to convert an NVO3 encapsulated packet into an MPLS packet. The NVA delivers routing information advertised by the CE2 and a corresponding NVO3 encapsulation entry to the NVE. Specifically, the NVA delivers routing information to the NVE1, where the routing information includes a correspondence between an identifier of the PE device and the allocated IP address, which is used to perform NVO3 encapsulation.

In this embodiment, a function of the ASBR1 is replaced with the NVA, including: allocating the IP address to the PE in the MPLS network from the local address pool. The allocation step may specifically include: receiving, by the NVA, a first BGP packet sent by the ASBR2 in the MPLS network, where the first BGP packet carries an identifier of the PE device and a first MPLS label allocated by the ASBR2, the first MPLS label is used as an outer label of a packet sent by the ASBR1 to the PE device; and allocating, by the NVA, an IP address for the first MPLS label. The identifier of the PE device may be specifically an IP address of the PE device.

Referring to FIG. 4a, it is assumed that an IP address allocated by the NVA for 20.1.1.1 is 30.1.1.1. The NVA may advertise routing information to the NVE, where the routing information includes the IP address 20.1.1.1 of the PE, and the IP address 30.1.1.1 allocated by the NVA.

E103. The PE allocates an MPLS VPN label for an identifier, for example, an IP address prefix or a MAC address, advertised by the CE1, where the MPLS VPN label is used to identify a VPN (that is, the VPN1) to which the CE1 device belongs; and advertises the allocated MPLS VPN label (and the IP address prefix or the MAC address advertised by the PE may further be included) to the NVA, and the NVA delivers the MPLS VPN label to the NVE. The NVE may import the IP address prefix or the MAC address that is advertised by the PE and that is delivered by the NVA into a local VPN routing and forwarding table.

Referring to FIG. 3a, it is assumed that an MPLS VPN label that is allocated by the PE and that is used to identify the VPN1 is 2000.

E2. A data plane solution for a packet in an uplink direction may include:

The data plane solution for a packet in an uplink direction is the same as FIG. 3*b* and step A2 of Embodiment 3 corresponding to FIG. 3*b*. For detailed content, refer to the foregoing description, and details are not described herein.

F1. A control plane solution for a packet in a downlink direction may include:

F101. The NVA in the NVO3 network allocates an MPLS label (which is specifically a BGP MPLS public network label) for an identifier of each NVE in the NVO3 network, adds the allocated MPLS label and an identifier of the corresponding NVE to a BGP packet, and sends the BGP packet to the ASBR2 in the MPLS network, where the identifier of the NVE may be specifically an IP address of the NVE, for example, IPv4 or IPv6.

The NVA further delivers the allocated MPLS label and a mapping entry corresponding to the identifier of the corresponding NVE to the ASBR1, which are used to convert an MPLS packet to an NVO3 encapsulated packet.

For example, referring to FIG. 4*b*, in this specification, it is assumed that: An IP address of the PE is 20.1.1.1, an IP address of the ASBR2 is 200.1.1.1, an IP address of the ASBR1 is 100.1.1.1, and an IP address of the NVE is 10.1.1.1. It is assumed that an MPLS label allocated by the NVA for the identifier 10.1.1.1 of the NVE1 is 100, and the MPLS label is advertised to the ASBR2 by means of BGP label routing.

F102. The ASBR2 receives a BGP packet sent by the ASBR1, and allocates the MPLS label.

For example, referring to FIG. 3*c*, it is assumed that the ASBR2 allocates the MPLS label 200 for the identifier 10.1.1.1 of the ASBR1, and advertises the MPLS label 200 to the PE2 by means of BGP label routing.

F103. The NVA allocates an MPLS VPN label for the TES, where the MPLS VPN label is an identifier VN ID of an NVO3 virtual network to which the TES belongs; and sends VPN route to the PE device, where the VPN route carries an identifier of the TES and the MPLS VPN label. Optionally, the identifier of the TES may be an IP address prefix or a MAC address of the TES. After receiving the VPN route, the PE device may import the carried IP address prefix or MAC address of the TES into a local L2/L3 VPN forwarding table.

For example, referring to FIG. 4*b*, the NVA allocates an MPLS VPN label 1000 for an IP address of the TES1, where the MPLS VPN label is a VN ID of the NVO3 virtual network.

The NVA delivers, to the NVE, an NVO3 tunnel decapsulation entry and a routing entry corresponding to a TES1, including an MPLS VPN label allocated by the TES and the identifier of the TES.

F2. A data plane solution for a packet in a downlink direction may include:

The data plane solution for a packet in a downlink direction is the same as FIG. 3*d* and step B2 of Embodiment 3 corresponding to FIG. 3*b*. For detailed content, refer to the foregoing description, and details are not described herein.

As can be seen from the foregoing, in the aspects of the invention, no VRF or subinterface needs to be configured for each VPN on an ASBR, and the ASBR does not need to store or maintain VPN route either, but needs to store and maintain only route to a PE/NVE and a small quantity of MPLS labels and NVO3 encapsulation conversion entries. Therefore, the aspects of the invention can relieve burden of the ASBR, and has relatively good scalability.

Moreover, in the aspects of the invention, by way of conversion between NVO3 encapsulation and label encapsulation on the ASBR in the NVO3 network, inter-AS communication between the NVO3 network and the MPLS network is implemented, thereby resolving a problem that a general NVO3 network device does not support label forwarding, and cannot communicate with the MPLS network by using a conventional OPTION C inter-AS solution.

To better implement the foregoing aspects of the embodiments of the invention, the following further provides related apparatuses configured to cooperate to implement the foregoing aspects.

Embodiment 5

Figure 5A:
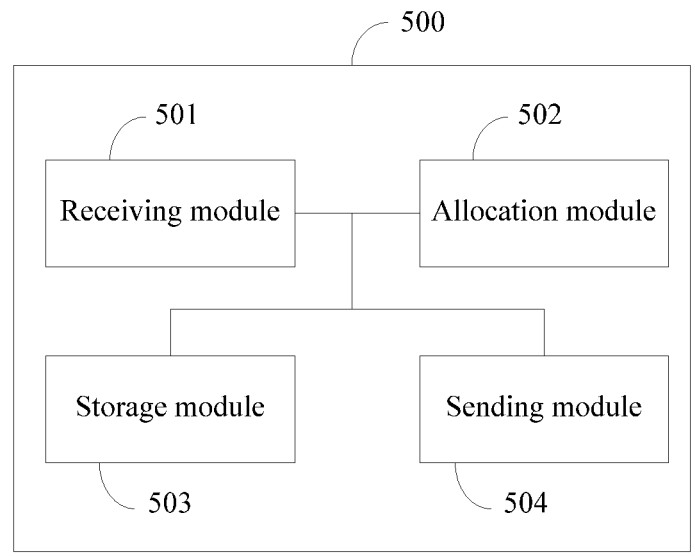
FIG. 5a is a schematic structural diagram of an ASBR according to one embodiment of the invention.

Referring to FIG. 5*a*, this embodiment of the invention provides an ASBR, where an NVO3 network is deployed in a first AS, an MPLS network is deployed in a second AS, and the ASBR is a border router (BR) in the first AS. The ASBR 500 may include:

a receiving module 501, configured to obtain an identifier of a provider edge PE device in the MPLS network and an MPLS label allocated by an ASBR in the MPLS network, where the MPLS label allocated by the ASBR in the MPLS network is used as an outer label of an MPLS encapsulated packet sent by an ASBR in the NVO3 network to the PE device;

an allocation module 502, configured to allocate an IP address for the MPLS label from a local address pool, where the ASBR in the NVO3 network communicates with an NVE in the NVO3 network, and a TES connected to the NVE and a CE device connected to the PE device belong to a same VPN;

a storage module 503, configured to store a correspondence between the MPLS label and the allocated IP address; and a sending module 504, configured to send routing information to the NVE, where the routing information includes an identifier of the PE device and the allocated IP address, and the allocated IP address is used as an outer destination address of an NVO3 encapsulated packet sent by the TES to the CE device.

In some embodiments, the receiving module 501 is specifically configured to receive a BGP packet sent by the ASBR in the MPLS network, where the BGP packet sent by the ASBR in the MPLS network carries the identifier of the PE device and the MPLS label allocated by the ASBR in the MPLS network.

Figure 5B:
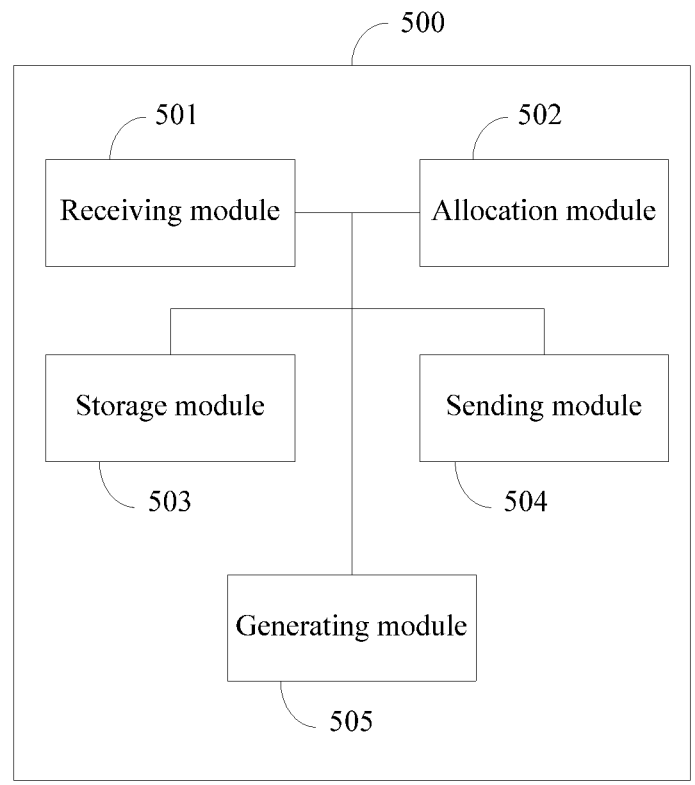
FIG. 5b is a schematic structural diagram of another ASBR according to one embodiment of the invention.

Referring to FIG. 5*b*, in some embodiments, the ASBR 500 may further include a generating module 505, where the receiving module 501 is further configured to receive an NVO3 encapsulated packet sent by the NVE, where an outer destination address of the NVO3 encapsulated packet is the allocated IP address, an outer source address of the NVO3 encapsulated packet is an IP address of the NVE, the NVO3 encapsulated packet further includes a VN ID, the VN ID is an MPLS VPN label advertised by the PE device, and the MPLS VPN label may be used to identify the VPN to which the CE device belongs;

the generating module 505 is configured to generate a packet, where the generated packet carries two layers of MPLS labels, the MPLS label allocated by the ASBR in the MPLS network is used as an outer label in the two layers of MPLS labels, the VN ID is used as an inner label in the two layers of MPLS labels, the generated packet does not include the outer destination address and the outer source address, and the generated packet further carries a payload of the NVO3 encapsulated packet; and the sending module 504 is further configured to send the generated packet to the ASBR in the MPLS network.

In some embodiments, the allocation module 502 is further configured to allocate an MPLS label for an identifier of the NVE; the sending module 502 is further configured to send a BGP packet to the ASBR in the MPLS network, where the BGP packet sent by the ASBR in the MPLS network carries the identifier of the NVE and the MPLS label allocated for the identifier of the NVE; and the storage module 503 is further configured to store a correspondence between the identifier of the NVE and the MPLS label allocated for the identifier of the NVE.

In some embodiments, the receiving module 501 is further configured to receive a packet forwarded by the ASBR in the MPLS network, where the packet forwarded by the ASBR in the MPLS network is from the PE device, an inner label of the packet forwarded by the ASBR in the MPLS network is an identifier ID of a virtual network VN to which the TES belongs, and an outer label of the packet forwarded by the ASBR in the MPLS network is the MPLS label allocated for the identifier of the NVE;

the generating module 505 is further configured to generate an NVO3 encapsulated packet, where an outer destination address of the generated NVO3 encapsulated packet is the IP address of the NVE, an outer source address of the generated NVO3 encapsulated packet is an IP address of the ASBR in the NVO3 network, the generated NVO3 encapsulated packet further carries the VN ID of the virtual network to which the TES belongs, and the generated NVO3 encapsulated packet further carries a payload of the packet forwarded by the ASBR in the MPLS network; and the sending module 504 is further configured to send the generated NVO3 encapsulated packet to the NVE.

It may be understood that, functions of functional modules of the ASBR in this embodiment of the invention may be specifically implemented according to the method in the foregoing method embodiment. For specific implementation processes thereof, refer to related descriptions in the foregoing method embodiment, which are not described herein.

As can be seen from the foregoing, in some feasible implementation manners of the invention, by way of the foregoing aspects, the following technical effects are achieved:

By way of conversion between NVO3 encapsulation and label encapsulation on the ASBR in the NVO3 network, inter-AS communication between the NVO3 network and the MPLS network is implemented, thereby resolving a problem that a general NVO3 network device does not support label forwarding, and cannot communicate with the MPLS network by using a conventional OPTION C inter-AS solution.

Moreover, in the aspects of the invention, no VRF or subinterface needs to be configured for each VPN on the ASBR, and the ASBR does not need to store or maintain VPN route either, but needs to store and maintain only route to a PE/NVE and a small quantity of MPLS labels and NVO3 encapsulation conversion entries. Therefore, the aspects of the invention can relieve burden of the ASBR, and has relatively good scalability.

Embodiment 6

Figure 6A:
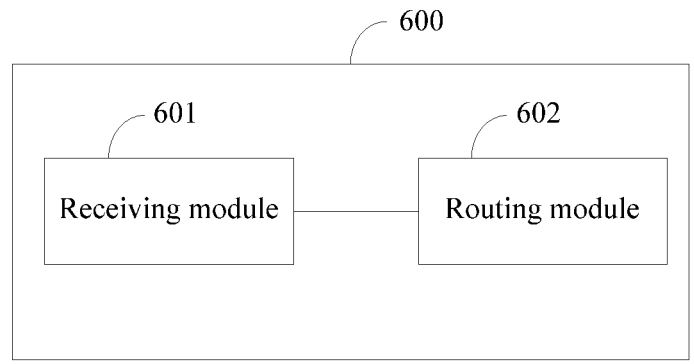
FIG. 6a is a schematic structural diagram of an NVE according to one embodiment of the invention.

Referring to FIG. 6a, this embodiment of the invention provides a NVE, where an NVO3 network is deployed in a first AS, an MPLS network is deployed in a second AS, and the NVE is applied to the first AS. The NVE 600 may include:

a receiving module 601, configured to receive routing information sent by an ASBR in the NVO3 network, where the routing information includes an IP address and an identifier that is of a PE device in the MPLS network. The IP address is allocated by the ASBR in the NVO3 network to the PE device from a local address pool, and is used as an outer destination address of an NVO3 encapsulated packet sent by a TES connected to the NVE to a CE device connected to the PE device, and the TES connected to the NVE and the CE device connected to the PE device belong to a same VPN, where the receiving module 601 is further configured to receive an MPLS VPN label advertised by the PE device and an identifier of the CE device, where the MPLS VPN label may be used to identify the VPN to which the CE device belongs; and a routing module 602, configured to generate VPN routing information, where the VPN routing information includes the identifier of the CE device, the allocated IP address, and a VN ID, the VN ID is the MPLS VPN label, and the allocated IP address is used as an outer destination address of NVO3 encapsulation.

Figure 6B:
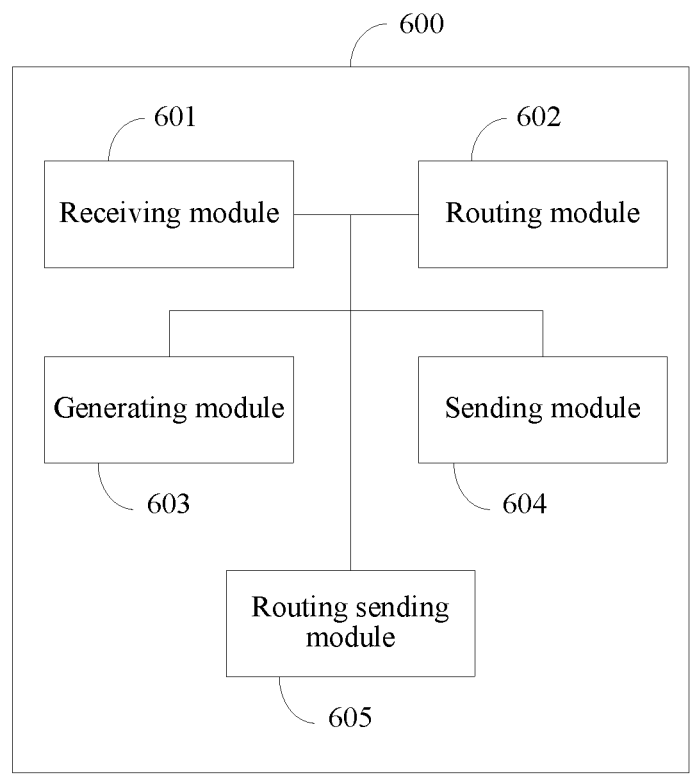
FIG. 6b is a schematic structural diagram of another NVE according to one embodiment of the invention.

Referring to FIG. 6b, in some embodiments, the NVE 600 may further include: a generating module 603 and a sending module 604, where the receiving module 601 is further configured to receive a packet sent by the TES to the PE device, where the packet sent to the PE device carries the identifier of the CE device;

the generating module 603 is configured to perform NVO3 encapsulation on the packet sent by the TES to the PE device, to generate an NVO3 encapsulated packet, where an outer destination address of the NVO3 encapsulated packet is the allocated IP address, an outer source address of the NVO3 encapsulated packet is an IP address of the NVE, the NVO3 encapsulated packet further includes a VN ID, the VN ID is the MPLS VPN label advertised by the PE device, and the MPLS VPN label is used to identify the VPN to which the CE device belongs; and the sending module 604 is configured to send the NVO3 encapsulated packet to the ASBR in the NVO3 network.

Referring to FIG. 6b, in some embodiments, the NVE 600 may further include:

a routing sending module 605, configured to send VPN route to the PE device, where the VPN route carries an MPLS VPN label and an identifier of the TES, and the MPLS VPN label carried in the VPN route is a VN ID of a virtual network to which the TES belongs.

Referring to FIG. 6b, in some embodiment, the receiving module 601 is further configured to receive an NVO3 encapsulated packet sent by the ASBR in the NVO3 network, where an outer destination address of the NVO3 encapsulated packet received by the NVE is an IP address of the NVE, an outer source address of the NVO3 encapsulated packet received by the NVE is an IP address of the ASBR in the NVO3 network, and the NVO3 encapsulated packet received by the NVE further carries the VN ID of the virtual network to which the TES belongs; and the sending module 604 is further configured to decapsulate the received NVO3 encapsulated packet, and send a decapsulated packet to the TES in the NVO3 network according to the VN ID of the virtual network to which the TES belongs.

It may be understood that, functions of functional modules of the NVE in this embodiment of the invention may be specifically implemented according to the method in the foregoing method embodiment. For specific implementation processes thereof, refer to related descriptions in the foregoing method embodiment, which are not described herein.

As can be seen from the foregoing, in some feasible implementation manners of the invention, by way of the foregoing aspects, the following technical effects are achieved:

By way of conversion between NVO3 encapsulation and label encapsulation on the ASBR in the NVO3 network, inter-AS communication between the NVO3 network and the MPLS network is implemented, thereby resolving a problem that a general NVO3 network device does not support label forwarding, and cannot communicate with the MPLS network by using a conventional OPTION C inter-AS solution.

Moreover, in the aspects of the invention, no VRF or subinterface needs to be configured for each VPN on the ASBR, and the ASBR does not need to store or maintain VPN route either, but needs to store and maintain only route to a PE/NVE and a small quantity of MPLS labels and NVO3 encapsulation conversion entries. Therefore, the aspects of the invention can relieve burden of the ASBR, and has relatively good scalability.

This embodiment of the invention further provides a computer storage medium, where the computer storage medium may store a program, and when the program is executed, a part or all of steps of a VPN inter-AS communication method recorded in the foregoing method embodiment 1 are included.

Figure 7:
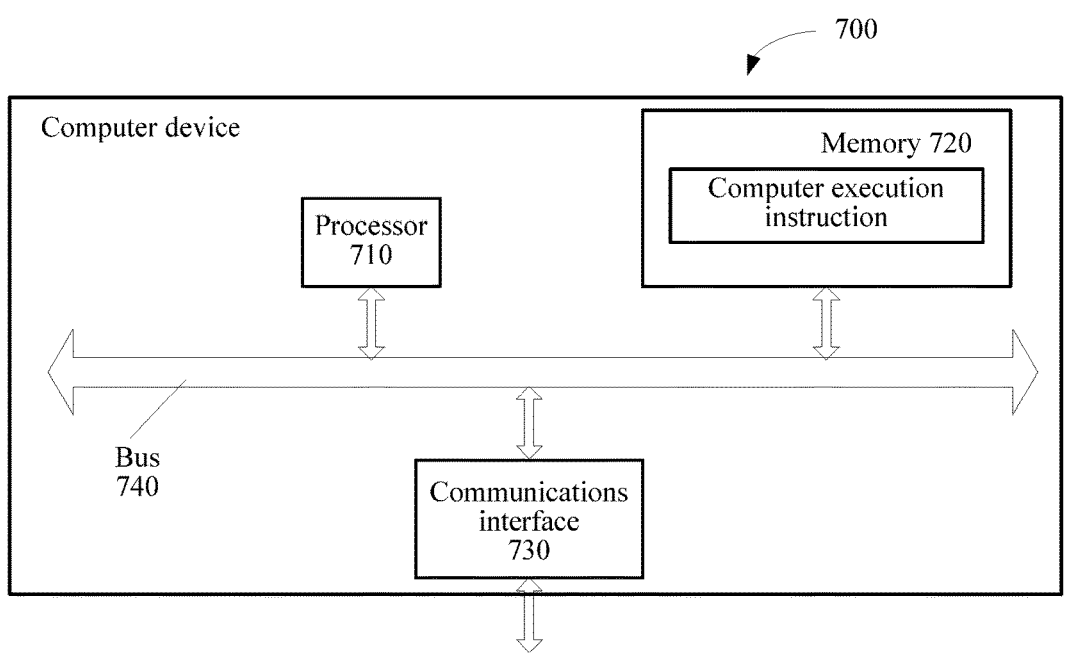
FIG. 7 is a schematic logical structural diagram of a computer device according to one embodiment of the invention.

Referring to FIG. 7, an embodiment of the invention further provides a computer device 700, which may include:

a processor 710, a memory 720, a communications interface 730, and a bus 740.

The memory 720 is configured to store a computer execution instruction, the processor 710 and the memory 720 are connected by using the bus 740, and when the computer device runs, the processor 710 executes the computer execution instruction stored in the memory 720, so that the computer device executes the method for implementing communication between an NVO3 network and an MPLS network according to the foregoing embodiments.

In the foregoing embodiments, the description of each embodiment has respective focuses. For a part that is not described in detail in an embodiment, reference may be made to related descriptions in other embodiments.

It should be noted that, for brief description, the foregoing method embodiments are represented as a series of actions. However, a person skilled in the art should appreciate that aspects of the invention is not limited to the described order of the actions, because according to the invention, some steps may be performed in other orders or simultaneously. In addition, a person skilled in the art should also understand that all the embodiments described in this specification belong to exemplary embodiments, and the involved actions and modules are not necessarily mandatory to the invention.

A person of ordinary skill in the art may understand that all or some of the steps of the methods in the embodiments may be implemented by a program instructing relevant hardware. The program may be stored in a computer-readable storage medium. The storage medium may include: a ROM, a RAM, a magnetic disk, or an optical disc.

The foregoing describes in detail a method for implementing communication between an NVO3 network and an MPLS network, and an apparatus that are provided in the embodiments of the invention. In this specification, specific examples are used to describe the principle and implementation manners of the invention, and the description of the embodiments is only intended to help understand the method and idea of the invention. At the same time, a person of ordinary skill in the art may, based on the idea of the invention, make modifications with respect to the specific implementation manners and the application scope. Therefore, the content of this specification shall not be construed as a limitation to the invention.

What is claimed is:

1. A method for implementing communication, comprising:

obtaining, by a device, an identifier of a provider edge (PE) device and a multiprotocol label switching (MPLS) label;

allocating, by the device, an Internet protocol (IP) address for the MPLS label;

storing, by the device, a correspondence between the MPLS label and the allocated IP address;

sending, by the device, routing information to a network virtualization edge (NVE), wherein the routing information comprises the identifier of the PE device and the allocated IP address;

receiving, by the device, a packet from the PE device, wherein an inner label of the received packet is a virtual network identifier (VN ID), and an outer label of the received packet is an MPLS label allocated for the identifier of the NVE;

generating, by the device, an encapsulated packet based on a correspondence between the identifier of the NVE and the MPLS label allocated for the identifier of the NVE, wherein an outer destination address of the generated encapsulated packet is the IP address of the NVE; and sending, by the device, the generated encapsulated packet to the NVE.

2. The method according to claim 1, further comprising before obtaining the identifier of the PE device and the MPLS label, receiving, by the device, a border gateway protocol (BGP) packet, wherein the BGP packet carries the identifier of the PE device and the MPLS label.

3. The method according to claim 1, further comprising:

receiving, by the device, an encapsulated packet sent by the NVE, wherein an outer destination address of the encapsulated packet is the allocated IP address;

generating, by the device, a packet based on the stored correspondence, wherein the generated packet carries the MPLS label, the generated packet does not comprise the allocated IP address; and sending, by the device, the generated packet.

4. The method according to claim 1, further comprising:

allocating, by the device, the MPLS label for an identifier of the NVE;

sending, by the device, a border gateway protocol (BGP) packet, wherein the BGP packet sent by the device carries the identifier of the NVE and the MPLS label allocated for the identifier of the NVE; and storing, by the device, the correspondence between the identifier of the NVE and the MPLS label allocated for the identifier of the NVE.

5. The method according to claim 1, wherein the identifier of the PE device is an IP address of the PE device.

6. A method for implementing communication, comprising:

receiving, by a network virtualization edge (NVE), routing information sent by a device, wherein the routing information comprises a correspondence between an Internet protocol (IP) address and an identifier of a provider edge (PE) device, the IP address is allocated by the device for a multiprotocol label switching (MPLS) label;

receiving, by the NVE, an MPLS virtual private network (VPN) label advertised by the PE device and an identifier of a customer edge (CE) device;

generating, by the NVE, VPN routing information, wherein the VPN routing information comprises the identifier of the CE device, the allocated IP address, and the MPLS VPN label;

sending, by the NVE, VPN route to the PE device, wherein the VPN route carries an MPLS VPN label and an identifier of a tenant end system (TES), and the MPLS VPN label carried in the VPN route is a virtual network identifier (VN ID) of a virtual network to which the TES belongs;

receiving, by the NVE, an encapsulated packet sent by the device, wherein an outer destination address of the encapsulated packet received by the NVE is an IP address of the NVE, an outer source address of the encapsulated packet received by the NVE is an IP address of the device, and the encapsulated packet received by the NVE further carries the VN ID of the virtual network to which the TES belongs; and decapsulating, by the NVE, the received encapsulated packet, and sending a decapsulated packet to the TES according to the VN ID of the virtual network to which the TES belongs.

7. The method according to claim 6, further comprising:

receiving, by the NVE, a packet sent to the PE device, wherein the packet sent to the PE device carries the identifier of the CE device;

generating an encapsulated packet based on the VPN routing information, wherein an outer destination address of the encapsulated packet is the allocated IP address; and sending, by the NVE, the encapsulated packet to the device.

8. The method according to claim 6, wherein the identifier of the PE device is an IP address of the PE device.

9. A computer network device for implementing communication, comprising:

a non-transitory memory storing computer execution instructions;

a processor coupled to the non-transitory memory, wherein the processor is configured to execute the instructions to:

obtain an identifier of a provider edge (PE) device and a multiprotocol label switching (MPLS) label;

allocate an Internet protocol (IP) address for the MPLS label;

store a correspondence between the MPLS label and the allocated IP address;

send routing information to a network virtualization edge (NVE), wherein the routing information comprises the identifier of the PE device and the allocated IP address;

receive a packet from the PE device, wherein an inner label of the received packet is a virtual network identifier (VN ID), and an outer label of the received packet is an MPLS label allocated for the identifier of the NVE;

generate an encapsulated packet based on a correspondence between the identifier of the NVE and the MPLS label allocated for the identifier of the NVE, wherein an outer destination address of the generated encapsulated packet is the IP address of the NVE; and send the generated encapsulated packet to the NVE.

10. The computer network device according to claim 9, wherein the processor is further configured to execute the instructions to:

receive a border gateway protocol (BGP) packet, wherein the BGP packet carries the identifier of the PE device and the MPLS label.

11. The computer network device according to claim 9, wherein the processor is further configured to execute the instructions to:

receive an encapsulated packet sent by the NVE, wherein an outer destination address of the encapsulated packet is the allocated IP address;

generate a packet based on the stored correspondence, wherein the generated packet carries the MPLS label, the generated packet does not comprise the allocated IP address; and send the generated packet.

12. The computer network device according to claim 9, wherein the processor is further configured to execute the instructions to:

allocate the MPLS label for an identifier of the NVE;

send a border gateway protocol (BGP) packet, wherein the BGP packet sent by the computer network device carries the identifier of the NVE and the MPLS label allocated for the identifier of the NVE; and store the correspondence between the identifier of the NVE and the MPLS label allocated for the identifier of the NVE.

13. A network virtualization edge (NVE) for implementing communication, comprising:

a non-transitory memory storing computer execution instructions;

a processor coupled to the non-transitory memory, wherein the processor is configured to execute the instructions to:

receive routing information sent by a device, wherein the routing information comprises a correspondence between an Internet protocol (IP) address and an identifier of a provider edge (PE) device, the IP address is allocated by the device for a multiprotocol label switching (MPLS) label;

receive an MPLS virtual private network (VPN) label advertised by the PE device and an identifier of a customer (CE) device;

generate VPN routing information, wherein the VPN routing information comprises the identifier of the CE device, the allocated IP address, and the MPLS VPN label;

send VPN route to the PE device, wherein the VPN route carries an MPLS VPN label and an identifier of a tenant end system (TES) connected to the NVE, and the MPLS VPN label carried in the VPN route is a virtual network identifier (VN ID) of a virtual network to which the TES belongs;

receive an encapsulated packet sent by the device, wherein an outer destination address of the NVO3 encapsulated packet received by the NVE is an IP address of the NVE, an outer source address of the encapsulated packet received by the NVE is an IP address of the device, and the encapsulated packet received by the NVE further carries the VN ID of the virtual network to which the TES belongs; and decapsulate the received encapsulated packet, and send a decapsulated packet to the TES according to the VN ID of the virtual network to which the TES belongs.

14. The NVE according to claim 13, wherein the processor is further configured to execute the instructions to:
- receive a packet sent to the PE device, wherein the packet sent to the PE device carries the identifier of the CE device;
- generate an encapsulated packet based on the VPN routing information, wherein an outer destination address of the encapsulated packet is the allocated IP address; and
- send the encapsulated packet to the device.

* * * * *